United States Patent
Lin

(10) Patent No.: US 8,848,043 B2
(45) Date of Patent: Sep. 30, 2014

(54) MULTI-VIEW 3D IMAGE DISPLAY METHOD

(75) Inventor: Ming-Yen Lin, Taipei (TW)

(73) Assignee: Zhangjiagang Kangde Xin Optronics Material Co., Ltd., Jiangsu Province (CN)

( * ) Notice: Subject to any disclaimer, the term of this patent is extended or adjusted under 35 U.S.C. 154(b) by 382 days.

(21) Appl. No.: 13/428,134

(22) Filed: Mar. 23, 2012

(65) Prior Publication Data

US 2012/0274630 A1    Nov. 1, 2012

(30) Foreign Application Priority Data

Apr. 26, 2011  (TW) .............................. 100114446 A

(51) Int. Cl.
*H04N 13/04*  (2006.01)
*H04N 9/47*   (2006.01)

(52) U.S. Cl.
CPC ....... *H04N 13/0409* (2013.01); *H04N 13/0415* (2013.01); *H04N 13/0422* (2013.01)
USPC .......................................... 348/54; 345/419

(58) Field of Classification Search
USPC ................................................... 348/41–161
See application file for complete search history.

(56) References Cited

U.S. PATENT DOCUMENTS

| | | | |
|---|---|---|---|
| 6,980,176 B2* | 12/2005 | Matsumoto et al. | 345/6 |
| 8,345,088 B2* | 1/2013 | Harrold et al. | 348/51 |
| 8,493,385 B2* | 7/2013 | Lin et al. | 345/419 |
| 8,531,455 B2* | 9/2013 | Relke et al. | 345/419 |
| 8,614,772 B2* | 12/2013 | Lin | 349/15 |
| 8,686,994 B2* | 4/2014 | Lin | 345/419 |
| 2009/0141122 A1* | 6/2009 | Hong | 348/54 |
| 2011/0170026 A1* | 7/2011 | Lin | 349/15 |

* cited by examiner

*Primary Examiner* — Joseph Ustaris
*Assistant Examiner* — Talha Nawaz
(74) *Attorney, Agent, or Firm* — WPAT, PC; Justin King

(57) ABSTRACT

A multi-view 3D image display method is provided, which is mainly to propose a multi-view 3D image combination method and slantwise strip parallax barrier structure design and optimization methods without reducing a sub-pixel aperture ratio during display of a multi-view 3D image by using a planar display screen having sub-pixels in strip configuration and a slantwise strip parallax barrier, so as to achieve objectives of solving a direct cross-talk phenomenon and balancing a phenomenon of asymmetrical left and right viewing freedom at the same time. In addition, for display of a multi-view 3D image having a total view number greater than two, a multiple multi-view 3D image combination and display method is proposed, so as to achieve an objective of alleviating a defect of discontinuous parallax jump.

20 Claims, 39 Drawing Sheets

MULTI-VIEW 3D IMAGE DISPLAY METHOD

BACKGROUND OF THE INVENTION

1. Field of Invention

The present invention relates to a multi-view 3D image display method, which is mainly to propose a multi-view 3D image combination method and a slantwise strip parallax barrier structure design and optimization method without reducing a sub-pixel aperture ratio during display of a multi-view 3D image by using a planar display screen having sub-pixels in strip configuration and a slantwise strip parallax barrier, so as to achieve objectives of solving a direct cross-talk phenomenon and balancing a phenomenon of asymmetrical left and right viewing freedom at the same time. In addition, for display of a multi-view 3D image having a total view number greater than two, a multiple multi-view 3D image combination and display method is proposed, so as to achieve an objective of reducing the defect of discontinuous parallax jump.

2. Related Art

FIG. 1 is a schematic view of a planar display screen having R, G, and B sub-pixels arranged in horizontal strip configuration. The planar display screen 1 may be a liquid crystal screen, plasma screen, or organic light emitting diode (OLED) screen, which is formed of (N×M) R, G, and B sub-pixels and has a feature of horizontal strip configuration. N is a total number of sub-pixels in a horizontal direction (X axis) of the display screen, and M is a total number of sub-pixels in a vertical direction (Y axis) of the display screen. j and i are the indexes of a horizontal position and a vertical position of a single sub-pixel respectively, where $0 \leq j \leq N-1$ and $0 \leq i \leq M-1$. The single sub-pixel has a size of $P_H \times P_V$, where $P_H$ is a horizontal width of a sub-pixel and $P_V$ is a vertical height of a sub-pixel. By subtracting a black space 2 between sub-pixels (which is usually formed of a non-luminous material and is black, for example, which is formed of black photoresist on a liquid crystal display panel and referred to as a black matrix), the effective luminous size of the single sub-pixel is H×V. It is defined that a horizontal aperture ratio $R_H$ and a vertical aperture ratio $R_V$ are respectively as follows:

$$R_H = H/P_H \quad (1), \text{ and}$$

$$R_V = V/P_V \quad (2).$$

The so-called horizontal strip configuration means that in any arbitrary horizontal scan line, the R, G, and B sub-pixels are arranged in a sequence of R, G, and B in a horizontal direction to form a strip structure with color distribution; while in a vertical direction, sub-pixels of a same color form a single-color strip structure.

In addition, a planar display screen (not shown) having R, G, and B sub-pixels in vertical strip configuration is also commercially available. The so-called vertical strip configuration is that in any arbitrary vertical scan line, the R, G, and B sub-pixels are arranged in a sequence of R, G, and B in a vertical direction to form a strip structure with color distribution; while in a horizontal direction, sub-pixels of the same color form a single-color strip structure.

Generally, for a planar display screen having R, G, and B sub-pixels in horizontal strip configuration, the size of a single sub-pixel thereof has a relation of $P_H \leq P_V$. For a planar display screen having R, G, and B sub-pixels in vertical strip configuration, a size of a single sub-pixel thereof has a relation of $P_H \geq P_V$. Regardless of the configuration direction of R, G, and B sub-pixels, for the two mentioned planar display screens above, it is commercially referred to as a planar display screen having R, G, and B sub-pixels in strip configuration in short. For simplicity of drawings and illustrations, in the present invention, a planar display screen having R, G, and B sub-pixels in horizontal strip configuration is taken as an example for illustrating effects of the present invention.

When the planar display screen 1 is used for displaying a 3D image, for example, as disclosed in U.S. Pat. No. 7,317,494 B2 (as shown in FIG. 2 to FIG. 9), a slantwise strip parallax barrier device is used to reduce the moire and decrease the cross-talk, so as to achieve an objective of displaying a 3D image.

FIG. 2 is a schematic view of a structure of a conventional 4-view combined 3D image. In the mentioned U.S. Patent, a 4-view combined 3D image is taken as an example for illustrating effects thereof. In the 4-view combined 3D image 4, four single view images ⓪, ①, ②, and ③ having a parallax effect form a smallest 3D image unit 6 or 7 by taking a sub-pixel as an unit according to a sequence of ⓪, ①, ②, and ③. In a horizontal direction, the smallest 3D image units 6 are repetitively arranged, so as to form a horizontal image of the multi-view combined 3D image 4. In a vertical direction, the smallest 3D image units 6 and 7 in the adjacent upper and lower rows are arranged in a manner of relatively displacing by a width of a sub-pixel.

FIG. 3 is a schematic view of a structure of a conventional 4-view slantwise strip parallax barrier. A 4-view slantwise strip parallax barrier 10 disclosed in the mentioned U.S. Patent is formed of a plurality of slantwise strip transparent components 11 and a plurality of slantwise strip opaque components 12. The slantwise strip transparent component 11 has an aperture width $B_4$, which may have the relation of the following formula:

$$B_4 = P_H \quad (3).$$

A slant angle θ of the 4-view slantwise strip parallax barrier 10 may be represented by the following formula:

$$\tan \theta = P_H/P_V \quad (4).$$

FIG. 4 is a schematic view of display principles of the conventional 4-view combined 3D image. For the 4-view combined 3D image 4 (that is, the image formed of ⓪, ①, ②, and ③) displayed on the planar display screen 1, the 4-view slantwise strip parallax barrier 10 may individually separate the 4-view combined 3D image 4 into four single view images ③, ②, ①, and ⓪ at multiple optimum viewing points $P_3$, $P_2$, $P_1$, and $P_0$ on an optimum viewing distance $Z_0$. Generally speaking, in the design of a parallax barrier, an interval between the optimum viewing points is made equal to an interpupillary distance (IPD) $L_E$. Therefore, as long as a viewer places the left and right eyes 15 respectively at proper positions, that is, $(P_3, P_2)$, or $(P_2, P_1)$, or $(P_1, P_0)$, the viewer may view a 3D image without cross-talk. In other words, for the display of a 4-view 3D image, three optimum viewing positions $(P_3, P_2)$, $(P_2, P_1)$, and $(P_1, P_0)$ are provided, so the viewer may view the 3D image without cross-talk. Therefore, the four optimum viewing points $P_3$, $P_2$, $P_1$, and $P_0$ form a group of viewing zones. Theoretically, on the optimum viewing distance $Z_0$, an infinite number of groups of viewing zones may exist. However, limited by the optical characteristics of the display screen (for example, a liquid crystal screen) and the parallax barrier (for example, a liquid crystal parallax barrier), usually only several groups of viewing zones exist.

FIG. 5 is a schematic view of a direct cross-talk phenomenon. For the above-mentioned 4-view slantwise strip parallax barrier 10, in a planar display screen having a relatively large aperture ratio (with a sub-pixel width $P_H$), as the slantwise strip transparent component 11 (having an aperture width $B_4=P_H$) spans two sub-pixels at the same time, that is, a phenomenon of spanning two view images occurs. Therefore, the cross-talk directly occurs (hereinafter, referred to as direct cross-talk), such that a high-quality 3D image is unable to be displayed.

FIG. 6 is a schematic view of a method for solving direct cross-talk in the conventional patent. For the above-mentioned defects, the solution proposed in the U.S. Patent is to properly reduce an aperture ratio of the planar display screen, so as to achieve an objective of reducing the direct cross-talk. Therefore, for the planar display screen 1, an effective luminous size of a single sub-pixel is reduced to H'×V', which satisfies the relation in the following formula:

$$H'=P_H \times (P_V-V')/P_V \qquad (5).$$

According to the formula (5), when the effective luminous size is $H'=P_H/2$ and $V'=P_V/2$, the problem of direct cross-talk is solved, and the requirement of minimum moire is satisfied. That is, when both the horizontal aperture ratio $R_H$ and the vertical aperture ratio $R_V$ are 0.5, the optimum effects are achieved.

In conclusion, in the U.S. Pat. No. 7,317,494 B2, mainly two methods are proposed: (1) the slantwise strip parallax barrier (having the structure denoted by the formulas (3) and (4)); and (2) setting both the horizontal aperture ratio $R_H$ and the vertical aperture ratio $R_V$ of the sub-pixel on the planar display screen to 0.5, so the objectives of solving the direct cross-talk and reducing the moire are solved at the same time. However, the current commercially available mainstream planar display screens (for example, thin-film transistor (TFT) liquid crystal screens) are all in pursuit of a technical aim of increasing the sub-pixel aperture ratio, and planar display screens having both $R_H$ and $R_V$ being 0.5 are no more unavailable. Even for a planar display screen adopting $R_H=R_V=0.5$, when the slantwise strip transparent component has an aperture width $B_4=P_H$, the phenomenon of moire may be properly moderated, but the brightness of the image is severely decreased and the horizontal viewing freedom is also reduced to a great extent. In addition, for the display of a multi-view combined 3D image having a total view number greater than 2, a solution for reducing discontinuous parallax jump is also unavailable.

The so-called horizontal viewing freedom refers to a horizontal viewing range without cross-talk (referring to ROC Patent Applications No. 098128986 and No. 099107311), that is, an allowable maximum deviation range as the eyes deviate from the above optimum viewing points without seeing cross-talk.

FIG. 7 is a schematic view of changes of relative viewing angles and positions between the parallax barrier and the multi-view combined 3D image when the eyes deviate to the left. For a viewer with two eyes at the optimum viewing points (for example: the right eye is located at $P_0$, where an image without cross-talk ⓪ is perceived), when a viewing position of the viewer deviates to the left, the change of the perceived multi-view combined 3D image due to the change of the viewing angle is equivalent to the multi-view combined 3D image perceived after the parallax barrier displaces to the right. Therefore, for the multi-view combined 3D image at a position 16 indicated by the arrow (for example, a bottom end of a single sub-pixel), as the parallax barrier slants to the right, when the viewing position deviates to the left, the cross-talk occurs immediately, that is, the image at ① is perceived. In FIG. 8 and FIG. 9, the phenomenon of cross-talk resulted from the deviation of the viewing position may be analyzed more clearly.

FIG. 8 is a schematic view of a multi-view combined 3D image viewed by the right eye before the viewing position is changed. For the right eye 15 at $P_0$, and for the aperture 11 of the parallax barrier at the position 16 indicated by the arrow in FIG. 7, the image 21 perceived by the right eye 15 is only the image of the view ⓪, which is in a state of no cross-talk.

FIG. 9 is a schematic view of a multi-view combined 3D image viewed by the right eye after the viewing position moves to the left. When the right eye 15 moves to the left by a displacement amount $\Delta P_0$, through the aperture 11 of the parallax barrier, the image 22 of the view ⓪ and ① is perceived by the right eye 15 at the same time, so a cross-talk phenomenon occurs. In addition, for the images 21 and 22 viewed before and after movement, in fact, due to changes of imaging spatial frequencies, a phenomenon of moire also occurs.

In addition, in the mentioned patent, for the display of a multi-view 3D image having a total view number greater than 2, a phenomenon of discontinuous parallax jump also occurs, and yet no solution has been proposed.

FIG. 10 is a schematic view of the cause of the phenomenon of discontinuous parallax jump. In the following, a 4-view is taken as an example for illustration. Generally speaking, no matter whether a real-view image or an animated drawing is used as a source of a 3D image, the multi-view image is produced by making optical axes of four cameras 63, 62, 61, and 60 (angles of the optical axes are respectively: $\Omega_3, \Omega_2, \Omega_1,$ and $\Omega_0$) converge at a same point for a shot object 50, and setting an equal shooting-angle $\Delta\Omega_i$, so as to capture single-view images ③, ②, ①, and ⓪. The above image shooting process is generally referred to as a convergent 3D photography. The so-called equal shooting-angle means that the angular interval between adjacent optical axes is a constant. That is, the equal shooting-angle $\Delta\Omega_i$ is as defined in the following formula:

$$\Delta\Omega_i=\|\Omega_3-\Omega_2\|=\|\Omega_2-\Omega_1\|=\|\Omega_1-\Omega_0\| \qquad (6).$$

Therefore, as shown in FIG. 4, through the display of the 4-view combined 3D image, three optimum viewing positions $(P_3,P_2)$, $(P_2,P_1)$, and $(P_1,P_0)$ can be provided to the viewer. The viewers at the three optimum viewing positions may respectively view 3D images with different viewing angles. That is, the 3D image with the viewing angle $\Omega_{32}$ may be viewed at $(P_3,P_2)$, the 3D image with the viewing angle $\Omega_{21}$ may be viewed at $(P_2,P_1)$, and the 3D image with the viewing angle $\Omega_{10}$ may be viewed at $(P_1,P_0)$. For the viewing angles $\Omega_{32}, \Omega_{21},$ and $\Omega_{10}$, an equal shooting-angle $\Delta\Omega_0$ may be defined, for example, as represented by the following formula:

$$\Delta\Omega_0=\oplus\Omega_{32}-\Omega_{21}\|=\|\Omega_{21}-\Omega_{10}\| \qquad (7).$$

The so-called phenomenon of discontinuous parallax jump means that as the equal shooting-angle $\Delta\Omega_o$ is too large, the viewer may easily find that the 3D image of the shot object 50 is presented with changes of discontinuous angles when changing the optimum viewing position in the horizontal direction, thereby causing discomfort in viewing. Generally, the $\Delta\Omega_o$ is reduced (that is, the $\Delta\Omega_i$ is reduced to weaken the parallax effect) to reduce the phenomenon of discontinuous parallax jump; however, this method severely affects the sense of reality (that is, 3D sense) of the 3D image.

In conclusion, although the major technology (of reducing the aperture ratio of the sub-pixel on the planar display screen) proposed in the U.S. Pat. No. 7,317,494 B2 may properly reduce the phenomenon of moire, the following situations occur: (1) the brightness of the image is reduced; (2) the horizontal viewing freedom is greatly reduced; and (3)

the defects such as the discontinuous parallax jump still exist. In addition, only text description is proposed for the combination of the multi-view 3D image, and even incorrect design ($B_4=P_H$) is proposed for the basic structure of the slantwise strip parallax barrier. Therefore, for the combination of the multi-view 3D image and the structure design of the slantwise strip parallax barrier, the patent also fails to propose a generally used and specific method to adapt to applications of an arbitrary view number.

SUMMARY OF THE INVENTION

The present invention is directed to a multi-view 3D image display method, which is mainly to propose a multi-view 3D image combination method and slantwise strip parallax barrier structure design and optimization methods without reducing a sub-pixel aperture ratio during display of a multi-view 3D image by using a planar display screen having sub-pixels in strip configuration and a slantwise strip parallax barrier for the defects in the prior art according to the theories and technologies as disclosed in the ROC Patent Applications No. 098128986, No. 099107311, and No. 099134699, so as to achieve objectives of solving a direct cross-talk phenomenon and balancing a phenomenon of asymmetrical left and right viewing freedom at the same time. In addition, for display of a multi-view 3D image having a total view number greater than two, a multiple multi-view 3D image combination and display method is proposed, so as to achieve an objective of reducing a defect of discontinuous parallax jump. The present invention provides description for the display of a multi-view combined 3D image having an arbitrary view number. However, in order to simplify the drawings and compare direct differences with the content of the conventional U.S. Pat. No. 7,317,494 B2, a 4-view is taken as an example in the drawings below for illustrating the effects of the present invention.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

First Embodiment

Figure 11:
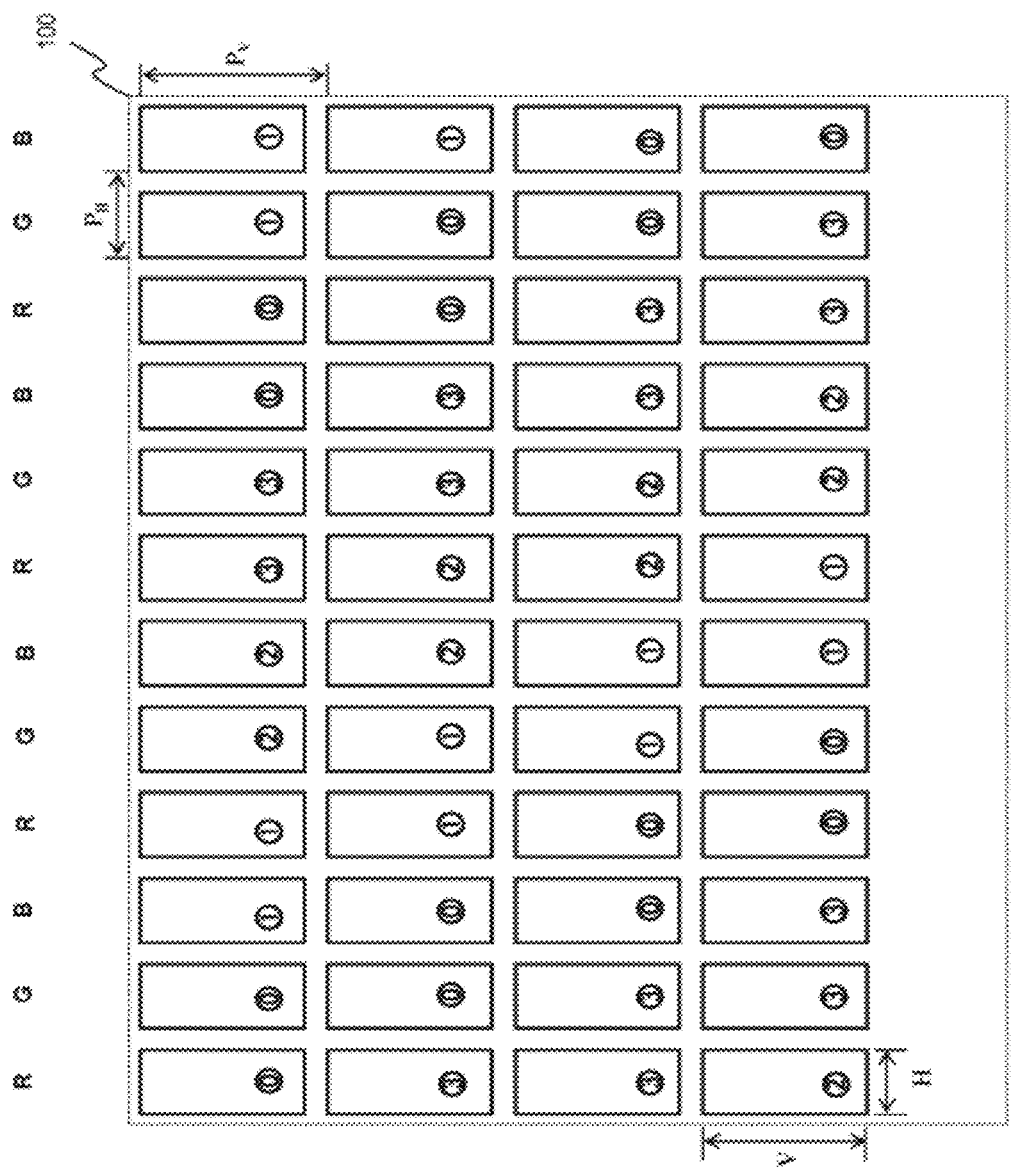
FIG. 11 is a schematic view of a structure of a multi-view combined 3D image according to a first embodiment of the present invention.

FIG. 11 is a schematic view of a structure of a multi-view combined 3D image according to a first embodiment of the present invention. A multi-view 3D image combination method proposed in the present invention is mainly an application developed for a slantwise strip parallax barrier structure by properly using the disclosed general formulas of multi-view 3D image combination in ROC Patent Application No. 099134699. For a single view image $V_k$ having a total view number n (n≥2), first, the single view image $V_k$ is defined as follows:

$$V_k = \sum_{i=0}^{M-1}\sum_{j=0}^{N-1} V_k^{i,j}, \tag{8}$$

where M, N, i, and j are as defined above, k is a view number, and 0≤k<n; $V_k^{i,j}$ is image data of a sub-pixel at a position (i,j) in the single view image $V_k$. Accordingly, the multi-view combined 3D image $\Sigma_n$ 100 may be generated through the operation with the following formula:

$$\Sigma_n = \sum_{i=0}^{M-1}\sum_{j=0}^{N-1} V_\Lambda^{i,j}, \tag{9}$$

where Λ is a view number, generated through the operation with the following formula:

$$\Lambda = \mathrm{Mod}\left[\mathrm{int}\left(\frac{j - \Pi \times \mathrm{int}\left(\frac{i+\Delta}{Q}\right)}{m}\right), n\right], \tag{10}$$

where n is a total view number; m is the number of sub-pixels of a horizontal smallest display unit; Q is the number of sub-pixels of a vertical smallest display unit; Δ is a horizontal displacement phase; and Π is a horizontal displacement amplitude. The so-called horizontal and vertical smallest display units refer to the smallest units of the view image that can be perceived through a single aperture of the parallax barrier transparent component (referring to the description hereinafter). For detailed definitions of m, Q, Δ, and Π, reference may be made to ROC Patent Application No. 099134699. In addition, int is a function of rounding, and Mod is a function of taking a remainder. The values adopted in this embodiment are respectively: n=4, m=2, Q=1, Δ=0, and Π=1. m=2 means that two sub-pixels are used as a unit to form a horizontal smallest display unit (in the U.S. Pat. No. 7,317,494 B2, m=1). Q=1 means that one sub-pixel is used as a unit to form a vertical smallest display unit (in the U.S. Pat. No. 7,317,494 B2, Q=1, but no description about the concept of the vertical smallest display unit is provided). As shown in FIG. 11, for the multi-view combined 3D image $\Sigma_n$ generated through the combination formulas (9) and (10), the configuration of the view images thereof has the feature of slanting to the right.

Figure 12:
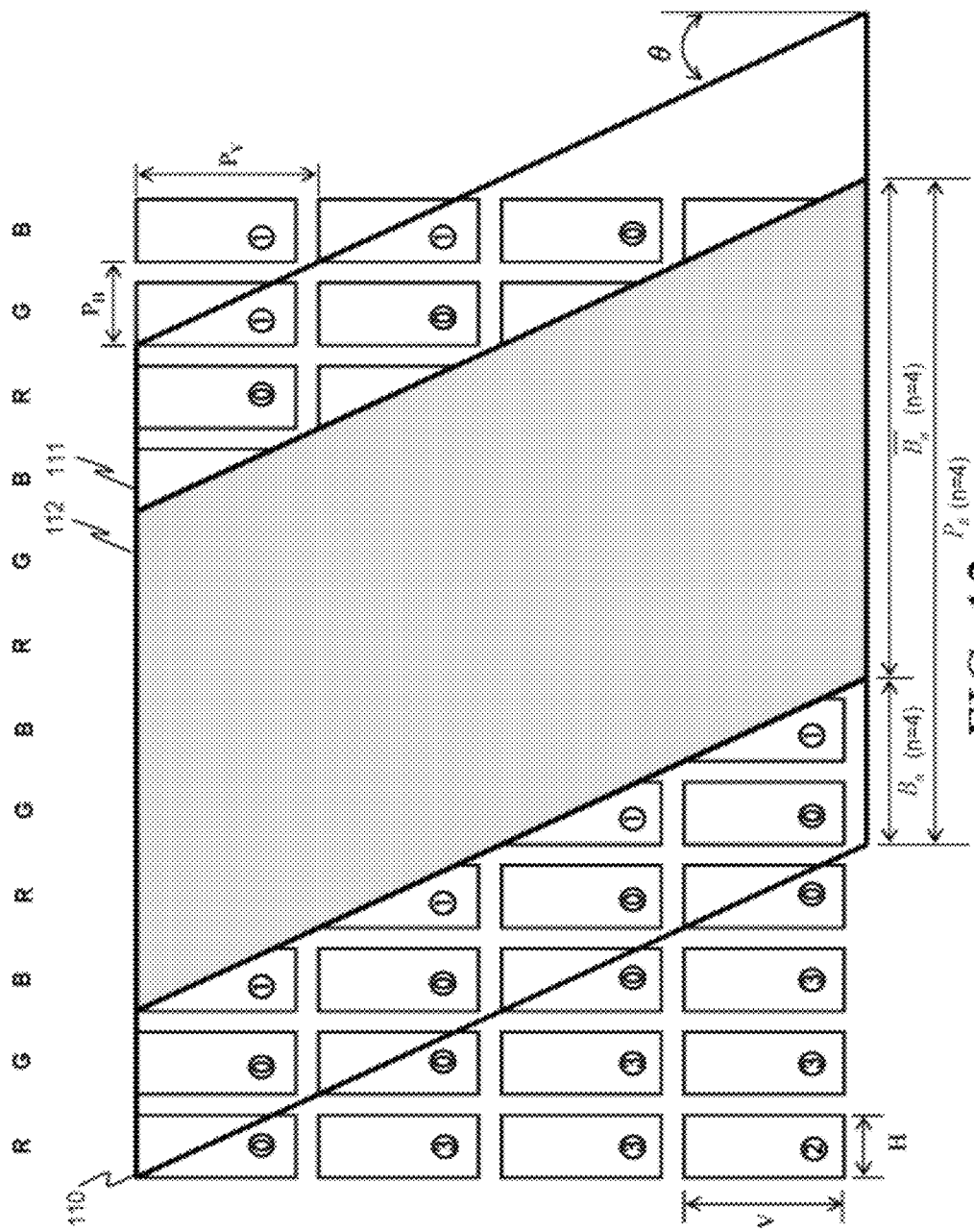
FIG. 12 is a schematic view of a structure of a slantwise strip parallax barrier according to the first embodiment of the present invention.

FIG. 12 is a schematic view of a structure of a slantwise strip parallax barrier according to the first embodiment of the present invention. In the Patent No. 099134699, a general formula of parallax barrier design is also provided, and the design in the following formulas may be provided for a right slantwise multi-view combined 3D image $\Sigma_n$ as shown in FIG. 11:

$$B_n = \frac{mP_H L_E}{mP_H + L_E}, \tag{11}$$

$$\overline{B}_n = (n-1)B_n, \text{ and} \tag{12}$$

$$\tan\theta = P_H / P_V, \tag{13}$$

where $B_n$ is an aperture width of a slantwise strip transparent component 111, $\overline{B}_n$ is an opaque width of a slantwise strip opaque component 112, and θ is a slant angle. $B_n + \overline{B}_n$ is a basic structure $P_B$ of the slantwise strip parallax barrier 110, and a complete parallax barrier may be formed by repetitively disposing the basic structure $P_B$ in a horizontal direction. In addition, m, $P_H$, and $L_E$ are as defined above. Accordingly, the formula (11) represents a corresponding relation between the single transparent component 111 and a horizontal smallest display unit image formed of m sub-pixels; and the formula (12) shows that the single basic structure $P_B$ has a periodic feature, that is, the relation of $B_n + \overline{B}_n = P_B = nB_n$ can be obtained from the formula (12), and the period is defined by the total view number n. In other words, the slantwise strip parallax barrier 110 designed according to the formula (12) is a parallax barrier capable of displaying n views, and an aperture of a single transparent component is capable of correspondingly displaying a view image formed of m sub-pixels. Similar to the defects in the mentioned U.S. Patent, a direct cross-talk phenomenon also occurs to the design as shown in FIG. 12. According to a parallax barrier aperture component optimization method as disclosed in ROC Patent Applications No. 098128986 and No. 099107311, that is, by using the method of properly reducing the aperture width, the objectives of solving the direct cross-talk phenomenon and increasing the viewing freedom may be achieved.

Figure 13:
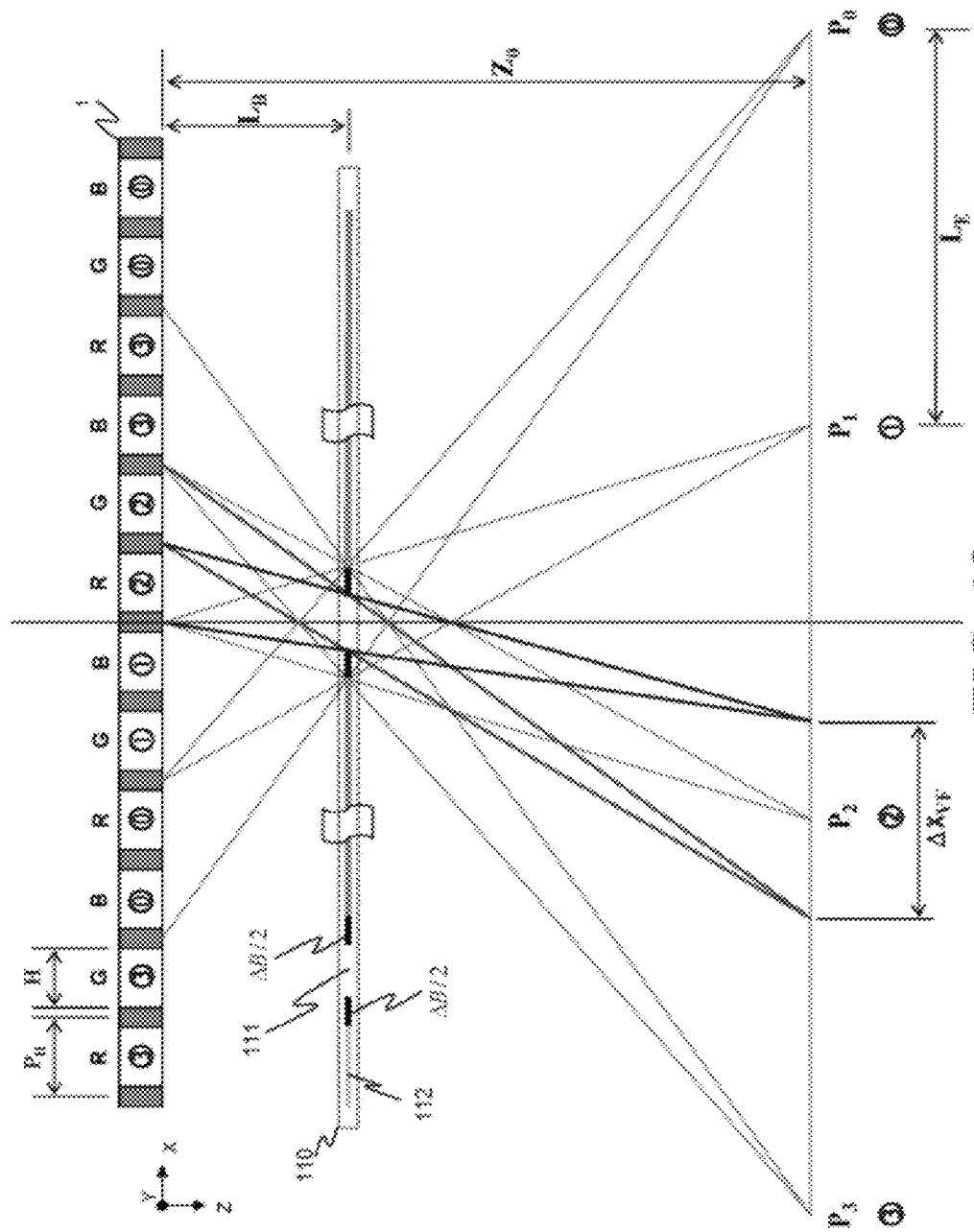
FIG. 13 is a schematic view of slantwise strip parallax barrier structure optimization according to the first embodiment of the present invention.

FIG. 13 is a schematic view of slantwise strip parallax barrier structure optimization according to the first embodiment of the present invention. According to the method as disclosed in the ROC Patent Application No. 099107311, for the slantwise strip parallax barrier 110 having the above structures $B_n$, $\overline{B}_n$, $P_B$, and θ, the installation distance of the slantwise strip parallax barrier 110 is set to $L_B$, so that at four optimum viewing points $P_3$, $P_2$, $P_1$, and $P_0$ on the optimum viewing distance $Z_0$, single view images ③, ②, ①, and ⓪ without cross-talk can be respectively perceived. In order to reduce the cross-talk, first, the aperture width $B_n$ of the transparent component 111 is reduced by a proper amount ΔB, so as to effectively increase the horizontal viewing freedom $\Delta X_{VF}$, and the relation in between may be represented by the following formula:

$$\Delta X_{VF} = \frac{\Delta B}{B_n} L_E. \tag{14}$$

According to the formula (14), as the value of the ΔB is increased to improve and raise the horizontal viewing freedom $\Delta X_{VF}$. However, as the value of the ΔB is increased, the brightness is reduced. The method for acquiring a compromised value between the two may be referred to in the Patent No. 098128986.

Figure 14:
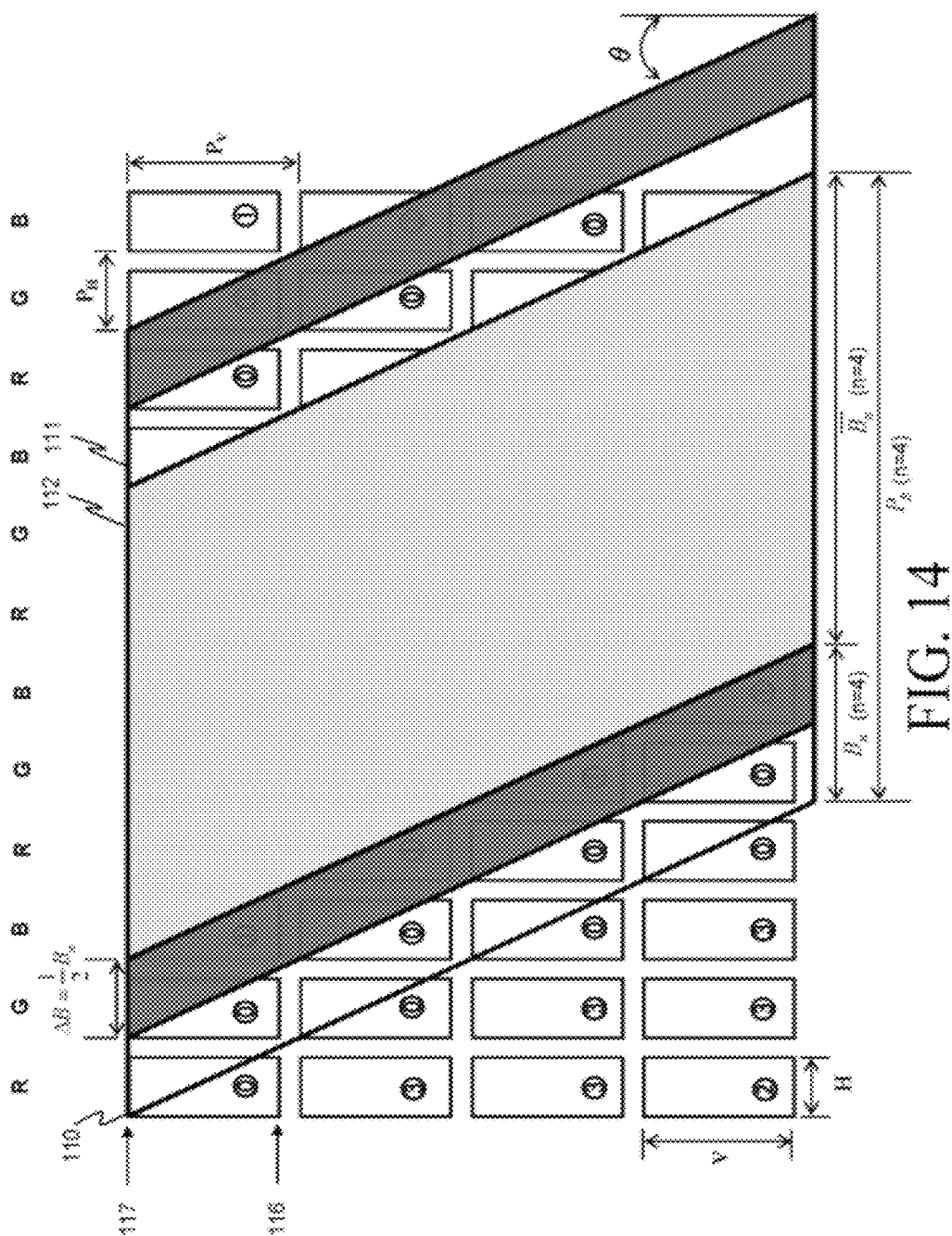
FIG. 14 and FIG. 15 are schematic views of possible reducing amounts of an aperture width of a transparent component according to the first embodiment of the present invention.
Figure 15:
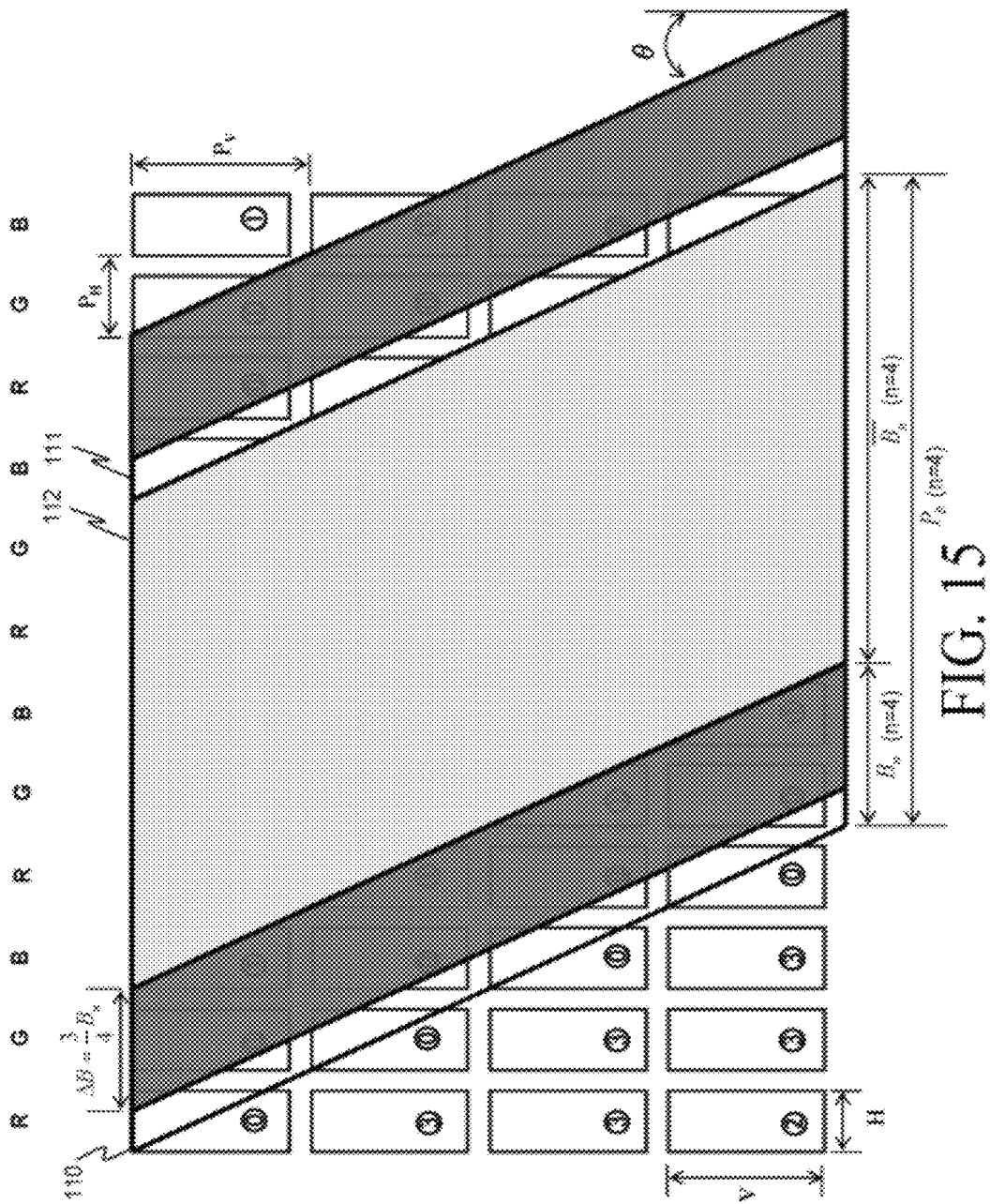

FIG. 14 and FIG. 15 are schematic views of possible reducing amounts of the aperture width of the transparent component according to the first embodiment of the present invention. As shown in FIG. 14, in order to effectively solve the above-mentioned direct cross-talk phenomenon, for the resducing amount ΔB of the aperture width, an optimum value thereof may be ΔB=(1/m)B$_n$, where the value of m is m=2 as discussed above. As the transparent component 111 has the slanting feature, for the transparent component apertures at a top end 117 and a bottom end 116 of the single sub-pixel, according to the formula (14), although the top end and the bottom end have the same ΔX$_{VF}$, the opaque effect is asymmetrical. That is, when the viewing position moves to the left, the transparent component at the top end 117 has a viewing freedom of 0.5L$_E$ to the left, while the transparent component at the bottom end 116 quickly enters the adjacent view image ① to present a cross-talk state. On the contrary, when the viewing position moves to the right, the above relation presents the opposite phenomenon. Accordingly, in order to balance the phenomenon of asymmetrical left and right viewing freedom, as shown in FIG. 15, the resducing amount ΔB of the aperture width may be increased to ΔB=(¾)B$_n$. Accordingly, the value of the resducing amount ΔB of the aperture width is ΔB≥(1/m)B$_n$, so the objectives of effectively solving the direct cross-talk phenomenon and balancing the phenomenon of asymmetrical left and right viewing freedom may be achieved at the same time.

Figure 16:
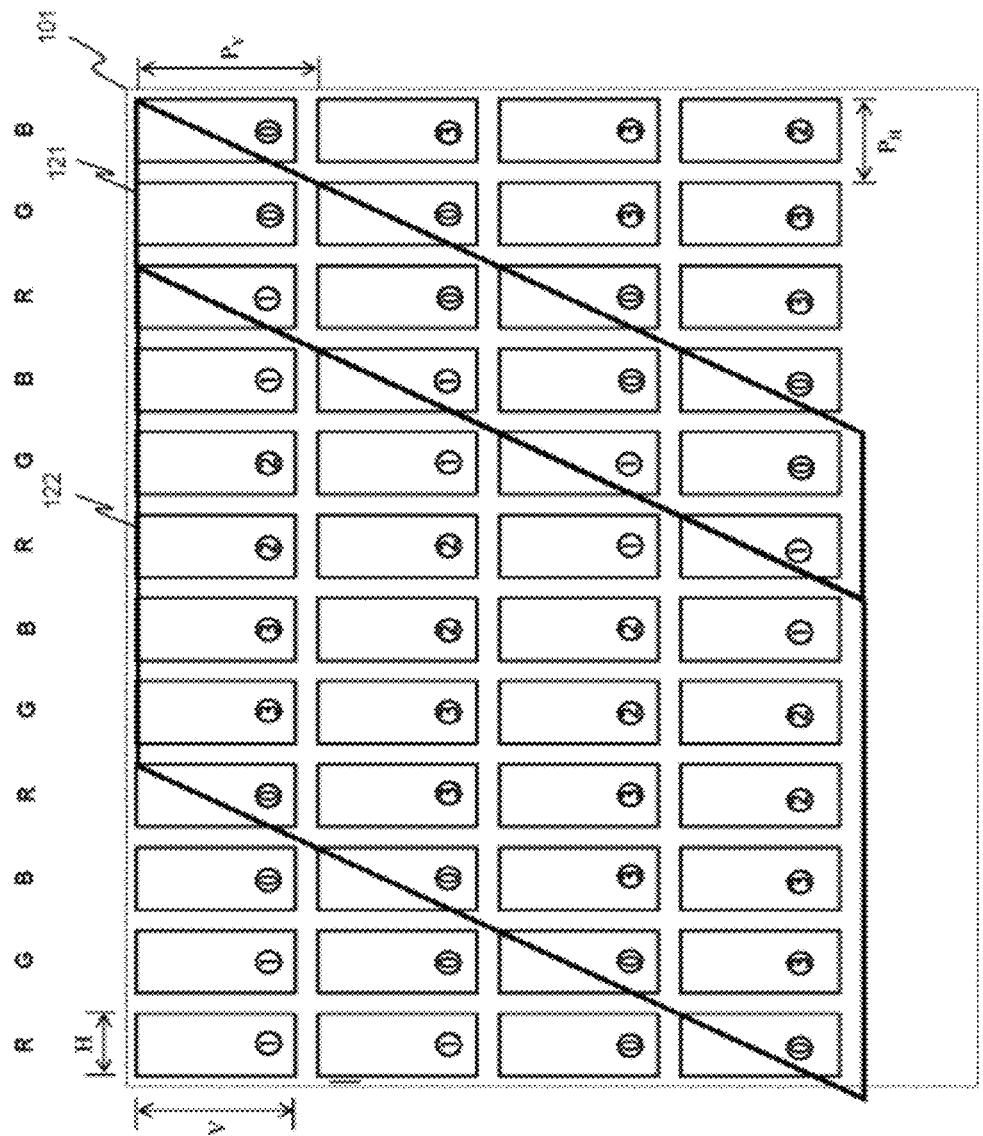
FIG. 16 is a schematic view of a multi-view combined 3D image and a slantwise strip parallax barrier structure having a feature of slanting to the left.

In addition, FIG. 16 is a schematic view of a multi-view combined 3D image and a slantwise strip parallax barrier structure having a feature of slanting to the left. In the Patent No. 099134699, another multi-view combined 3D image and slantwise strip parallax barrier structure having a feature of slanting to the left are also proposed. The multi-view combined 3D image 101, the transparent component 121, and the opaque component 122 all have the geometric feature of slanting from left to right. In addition, in order to clearly show the structure of the combined image, the drawing of the opaque component 122 is represented in a transparent manner. As the combined image and the slantwise strip parallax barrier structure slanting to left and right have a horizontal mirroring relation, the two share the same characteristics. Therefore, the details are no longer illustrated in the following embodiments.

Second Embodiment

Figure 17:
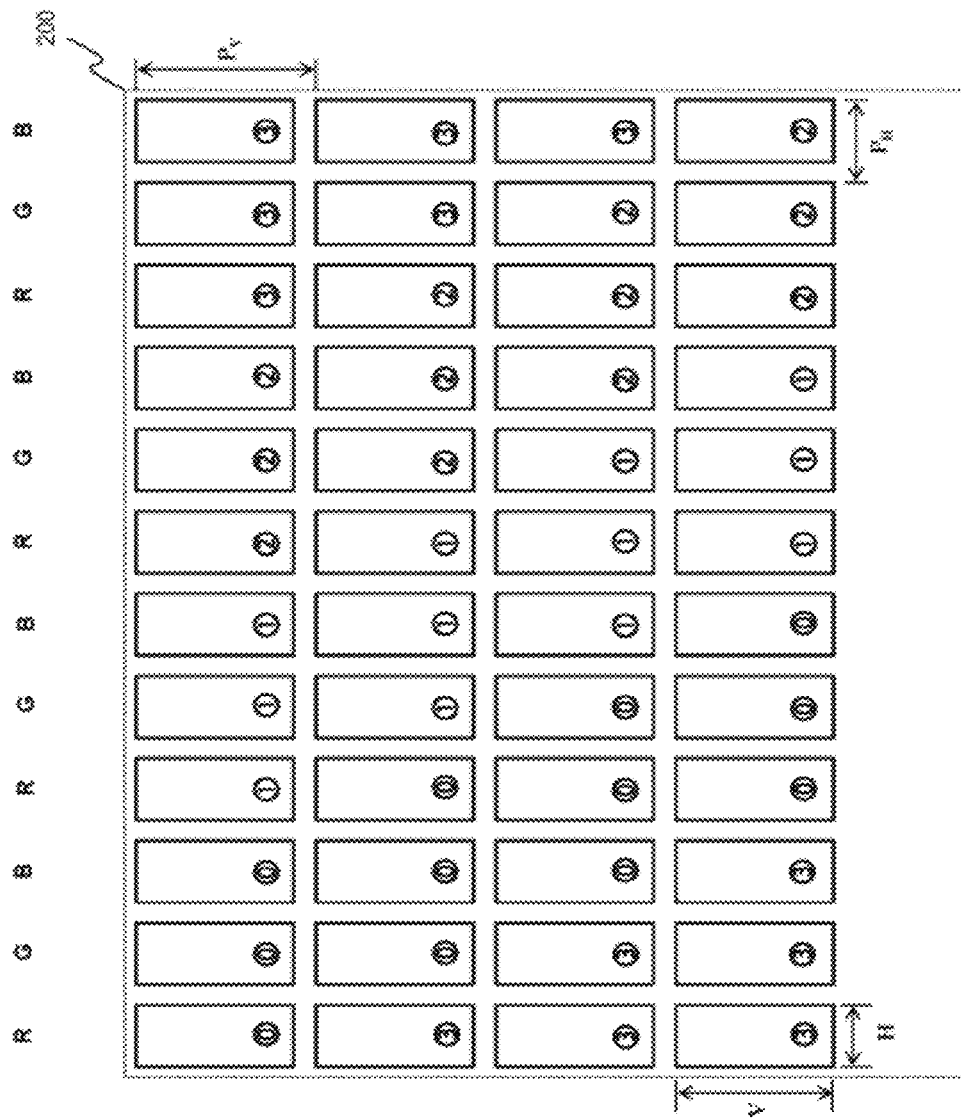
FIG. 17 is a schematic view of a structure of a multi-view combined 3D image according to a second embodiment of the present invention.

FIG. 17 is a schematic view of a structure of a multi-view combined 3D image according to a second embodiment of the present invention. The multi-view combined 3D image 200 is also generated through the operation of the formula (10), where n=4, m=3, Q=1, Δ=0, and Π=1. m=3 means that three sub-pixels are used as a unit to form a horizontal smallest display unit (in the U.S. Pat. No. 7,317,494 B2, m=1). Q=1 means that one sub-pixel is used as a unit to form a vertical smallest display unit (in the U.S. Pat. No. 7,317,494 B2, Q=1, but no description about the concept of the vertical smallest display unit is provided).

Figure 18:
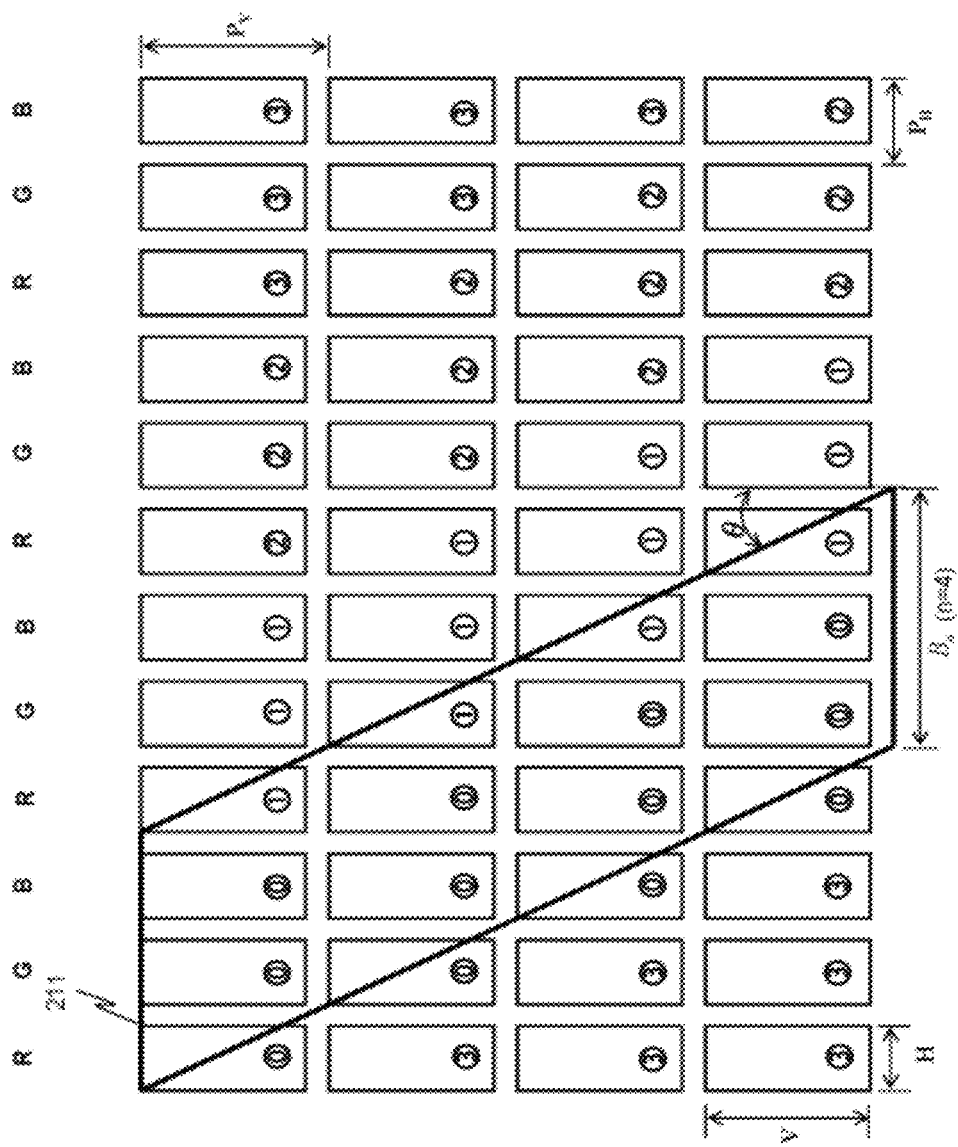
FIG. 18 is a schematic view of a structure of a slantwise strip parallax barrier according to the second embodiment of the present invention.

FIG. 18 is a schematic view of a structure of a slantwise strip parallax barrier according to the second embodiment of the present invention. The slantwise strip parallax barrier (only a transparent component 211 is shown) is also designed and generated through the formulas (11) to (13), where n=4 and m=3.

Figure 19:
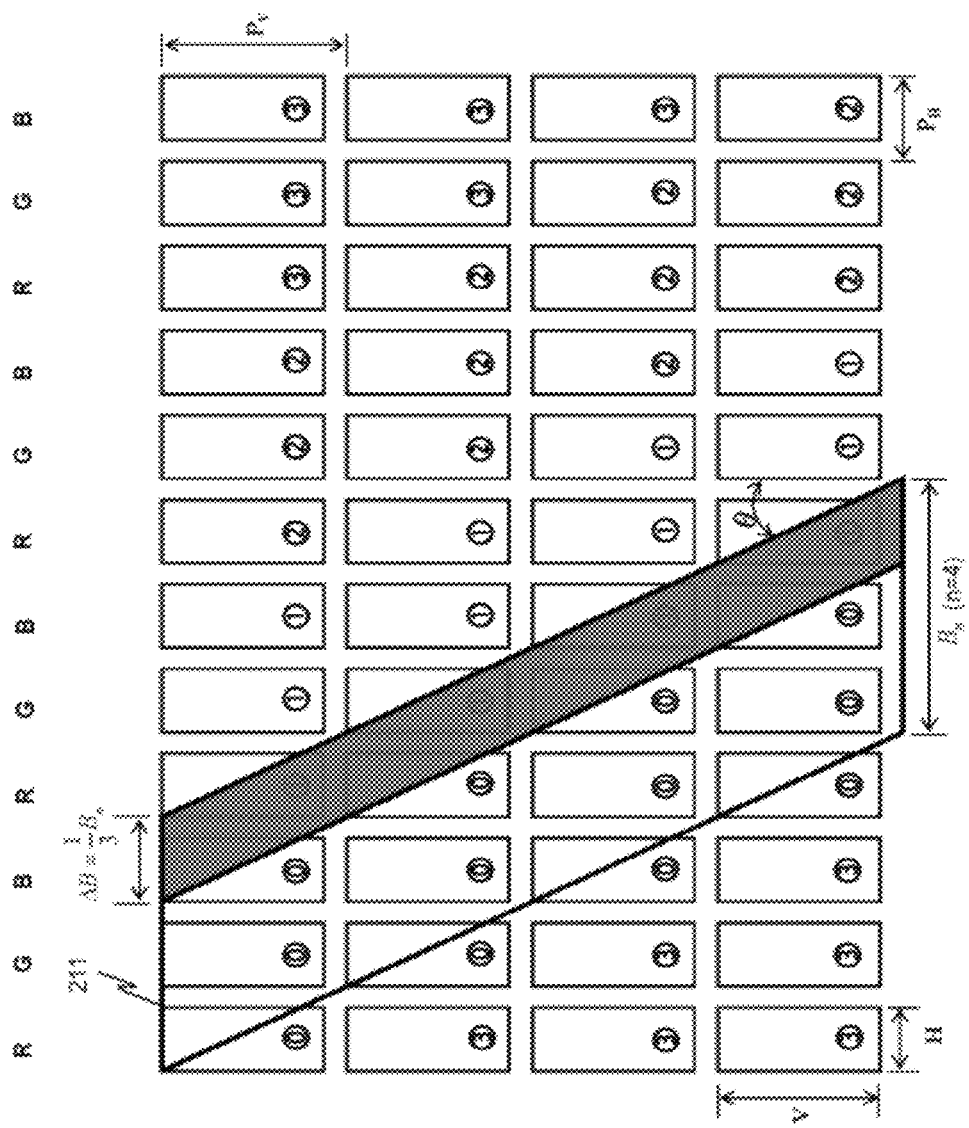
FIG. 19 and FIG. 20 are schematic views of possible reducing amounts of an aperture width of a transparent component according to the second embodiment of the present invention.
Figure 20:
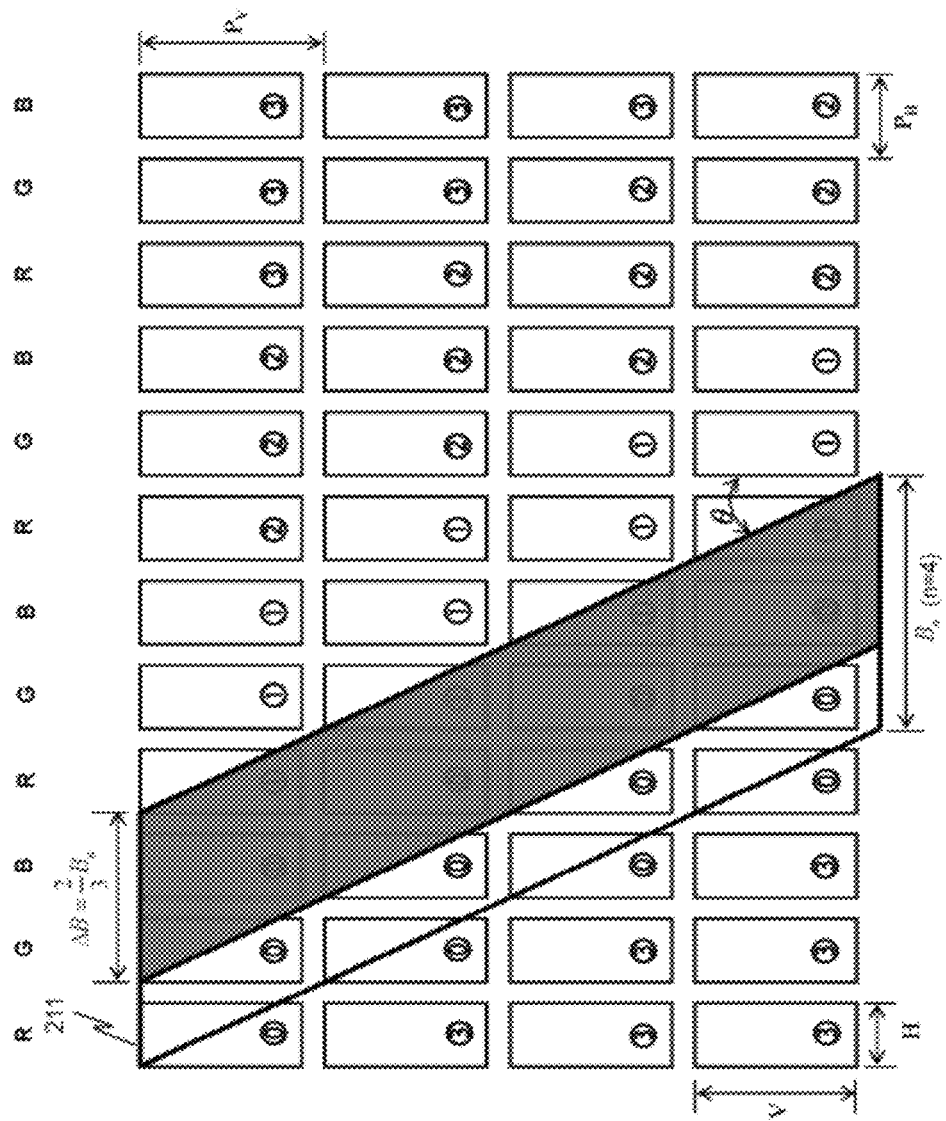

FIG. 19 and FIG. 20 are schematic views of possible reducing amounts of the aperture width of the transparent component according to the second embodiment of the present invention. As discussed in the first embodiment, for the method of reducing the aperture width of the transparent component 211, as shown in FIG. 19, the aperture width reducing amount is set to ΔB=(1/m)B$_n$, where m=3, so the objective of effectively solving the direct cross-talk phenomenon is achieved. In addition, as shown in FIG. 20, the aperture width reducing amount may also be set to ΔB≥(⅔)B$_n$, so the phenomenon of asymmetrical left and right viewing freedom is balanced. Accordingly, the value of the aperture width reducing amount ΔB needs to be set to ΔB≥(1/m)B$_n$, such that the objectives of effectively solving the direct cross-talk phenomenon and balancing the phenomenon of asymmetrical left and right viewing freedom are achieved at the same time.

Third Embodiment

Figure 21:
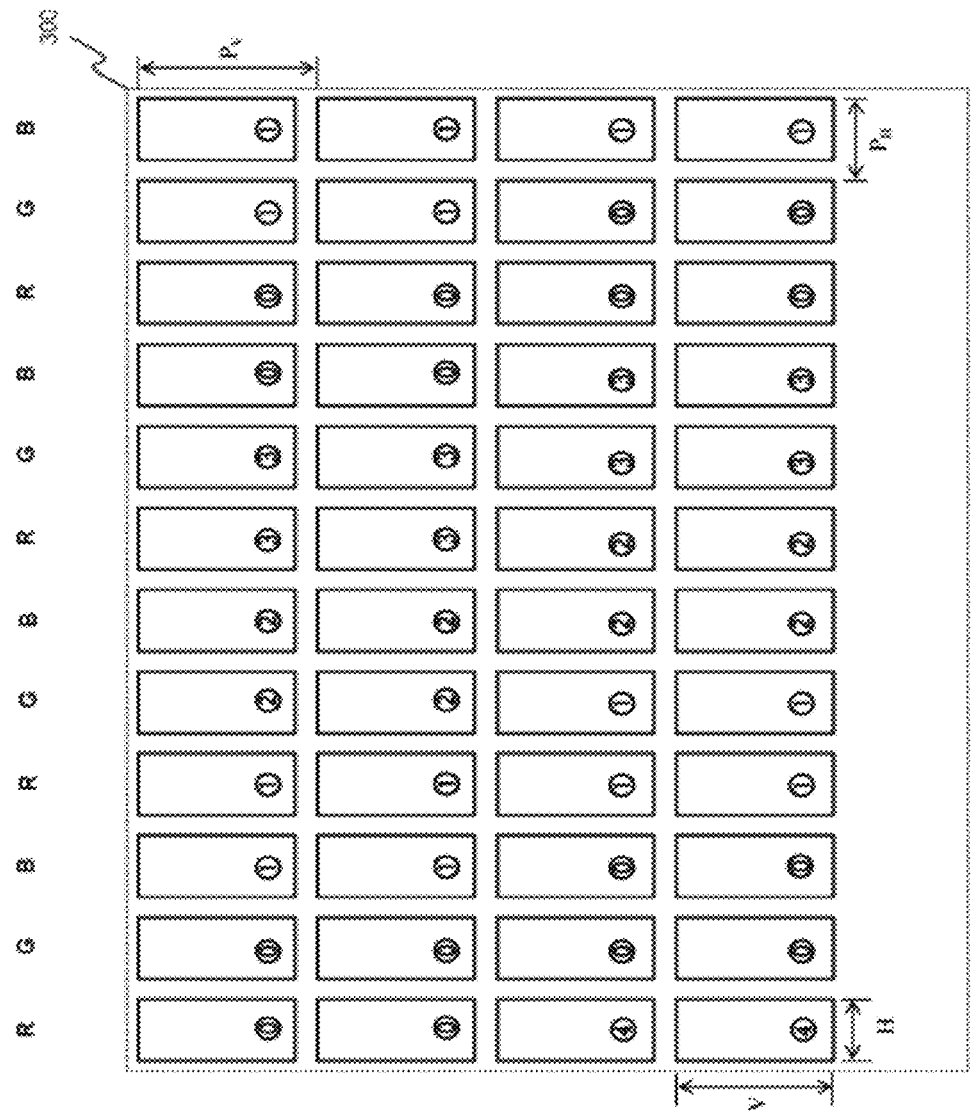
FIG. 21 is a schematic view of a structure of a multi-view combined 3D image according to a third embodiment of the present invention.

FIG. 21 is a schematic view of a structure of a multi-view combined 3D image according to a third embodiment of the present invention. The multi-view combined 3D image 300 is also generated through the operation of the formula (10), where values of all related parameters are: n=4, m=2, Q=2, Δ=0, and Π=1. m=2 means that two sub-pixels are used as a unit to form a horizontal smallest display unit (in the U.S. Pat. No. 7,317,494 B2, m=1). Q=2 means that two sub-pixels are used as a unit to form a vertical smallest display unit (in the U.S. Pat. No. 7,317,494 B2, Q=1, but no description about the concept of the vertical smallest display unit is provided).

Figure 22:
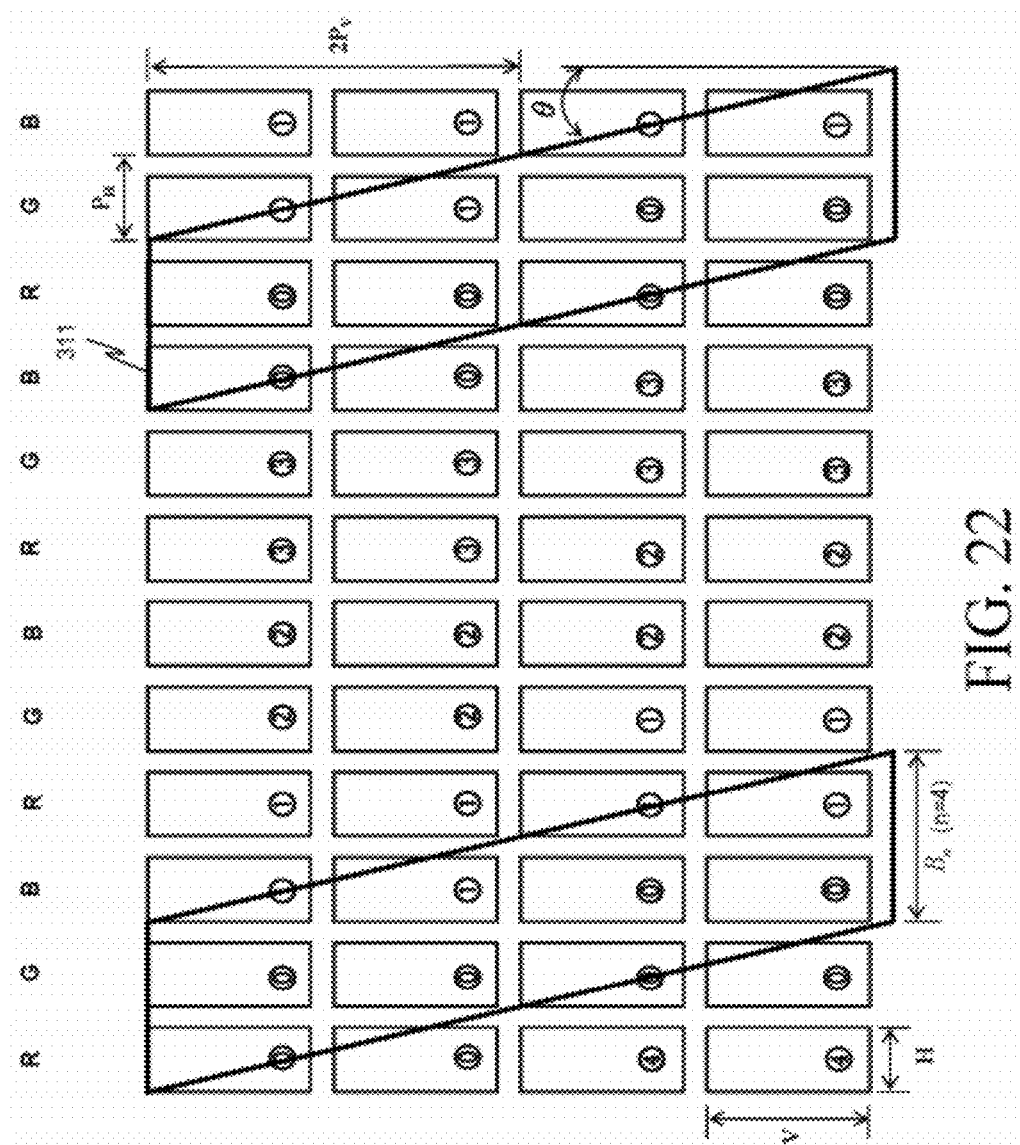
FIG. 22 is a schematic view of a structure of a slantwise strip parallax barrier according to the third embodiment of the present invention.

FIG. 22 is a schematic view of a structure of a slantwise strip parallax barrier according to the third embodiment of the present invention. The slantwise strip parallax barrier (only a transparent component 311 is shown) is designed and generated through the following formulas:

$$B_n = \frac{mP_H L_E}{mP_H + L_E}, \quad (15)$$

$$\overline{B}_n = (n-1)B_n, \text{ and} \quad (16)$$

$$\tan\theta = P_H / (Q'P_V), \quad (17)$$

where n and m are values as defined and set above (that is, n=4 and m=2); Q' is the slant weight, which defines a ratio of sub-pixels spanned by the aperture component in a vertical direction and a horizontal direction for the slantwise strip parallax barrier, and a value thereof may be: Q'=2 (Accordingly, the values of Q' in the first embodiment and the second embodiment are Q'=1). Here, the slant angle θ is defined by the formula (17), which is already completely different form the slant angle as defined in the U.S. Pat. No. 7,317,494 B2.

Figure 23:
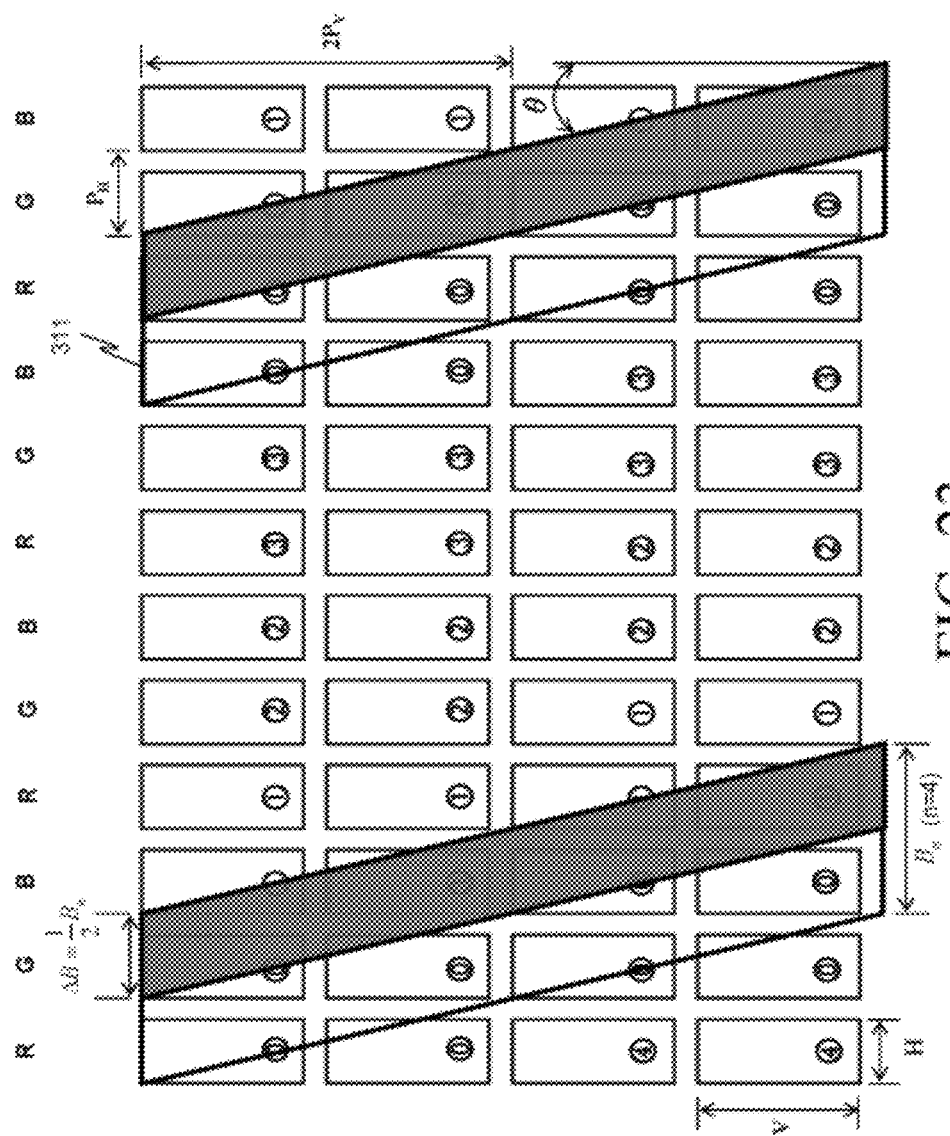
FIG. 23 and FIG. 24 are schematic views of possible reducing amounts of an aperture width of a transparent component according to the third embodiment of the present invention.
Figure 24:
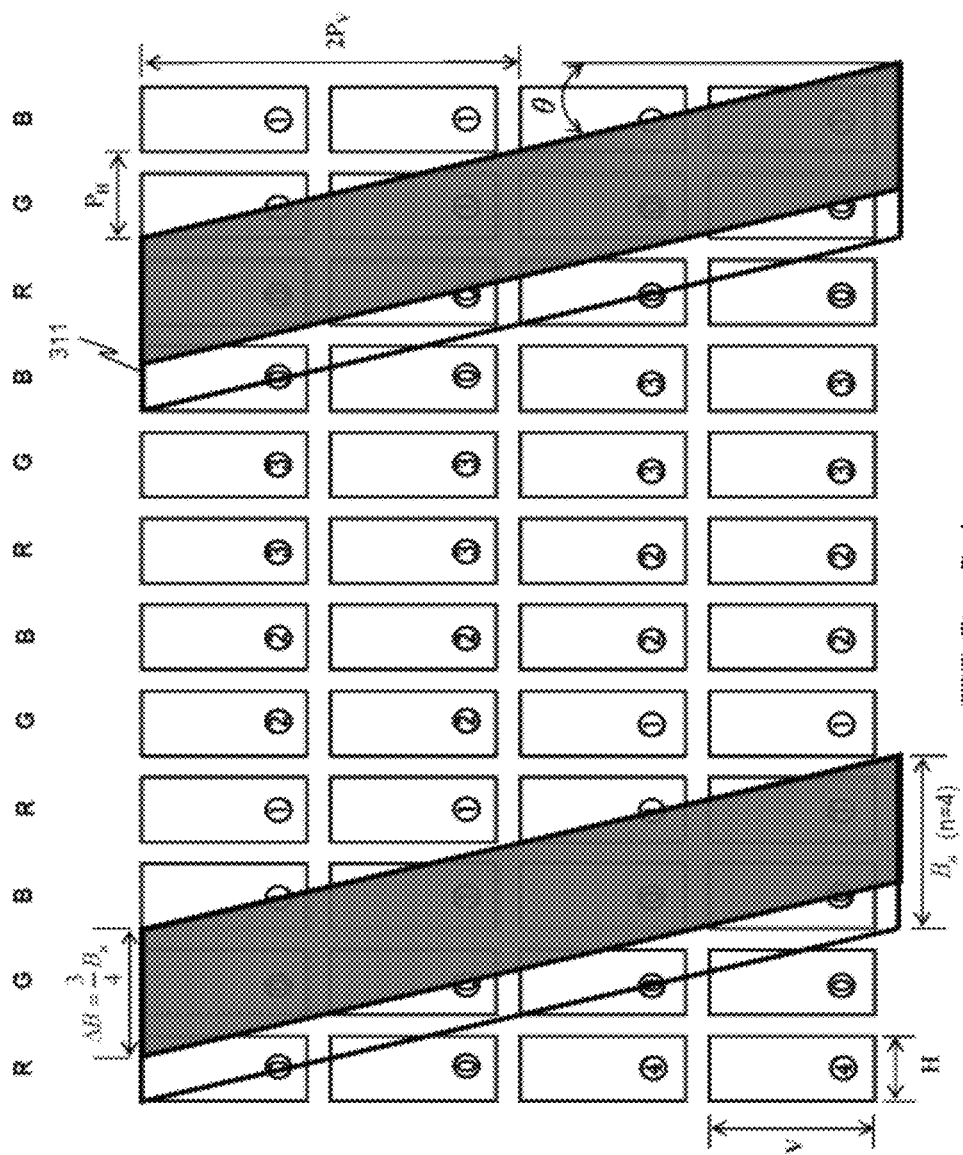

FIG. 23 and FIG. 24 are schematic views of possible reducing amounts of the aperture width of the transparent component according to the third embodiment of the present invention. As discussed in the first embodiment, for the method of reducing the aperture width of the transparent component 311, as shown in FIG. 23, the aperture width reducing amount is set to ΔB=(1/m)B$_n$, where m=2, so the objective of effectively solving the direct cross-talk phenomenon is achieved. In addition, as shown in FIG. 24, the aperture width reducing amount is set to ΔB=(¾)B$_n$, so the phenomenon of asymmetrical left and right viewing freedom is balanced. Accordingly, the value of the aperture width reducing amount ΔB is: ΔB≥(1/m)B$_n$, such that the objectives of effectively solving the direct cross-talk phenomenon and balancing the phenomenon of asymmetrical left and right viewing freedom may be achieved at the same time.

Figure 25:
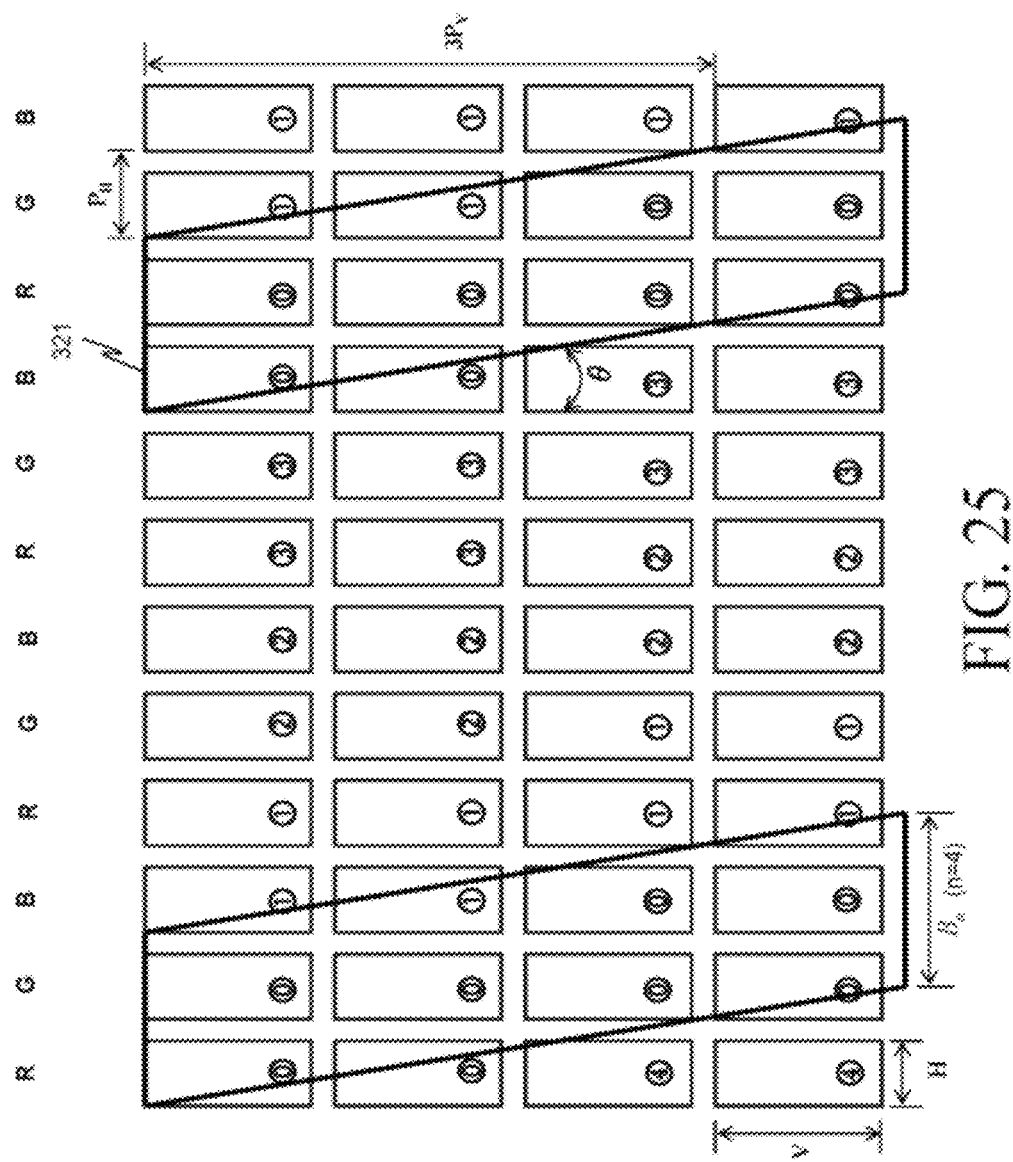
FIG. 25 and FIG. 26 are schematic views of a structure of a slant angle of the slantwise strip parallax barrier according to the third embodiment of the present invention.
Figure 26:
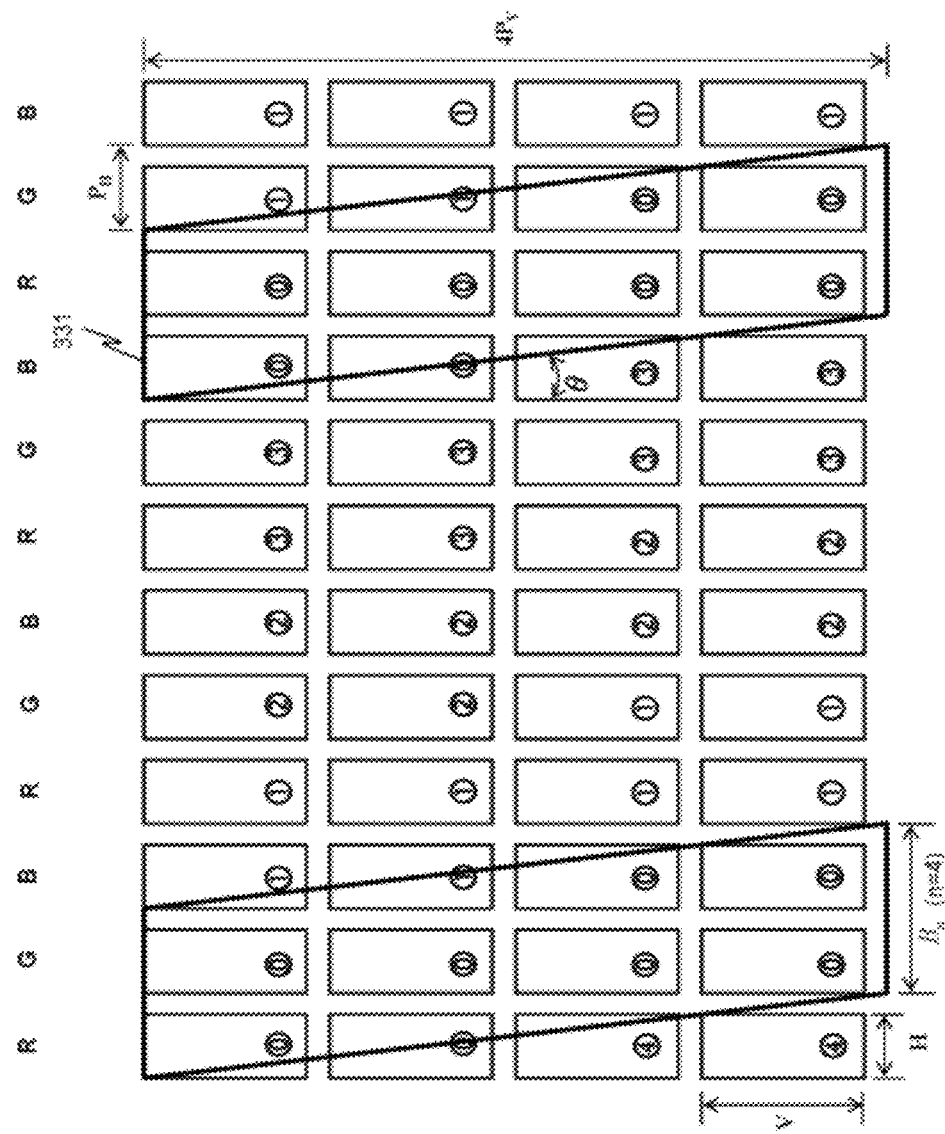

In addition, a slantwise strip parallax barrier structure having a different slant angle may also be designed according to the formula (17), that is, the value of Q' is set to Q'>2. FIG. 25 and FIG. 26 are schematic views of a structure of a slant angle of a slantwise strip parallax barrier according to the third embodiment of the present invention. As shown in FIG. 25, the slant angle θ of the slantwise strip parallax barrier is acquired when Q'=3, that is, θ=tan$^{-1}$[P$_H$/(3P$_V$)]; while as shown in FIG. 26, the slant angle θ of the slantwise strip parallax barrier is acquired when Q'=4, that is, θ=tan$^{-1}$[P$_H$/(4P$_V$)]. In addition, for the slantwise strip parallax barrier with Q'>2, the possible reducing amount (not shown) of the aperture width of the transparent component thereof, as the processing of reducing the aperture width as shown in FIG. 23 and FIG. 24, may also achieve the objectives of effectively solving the direct cross-talk phenomenon and balancing the phenomenon of asymmetrical left and right viewing freedom at the same time.

Fourth Embodiment

Figure 27:
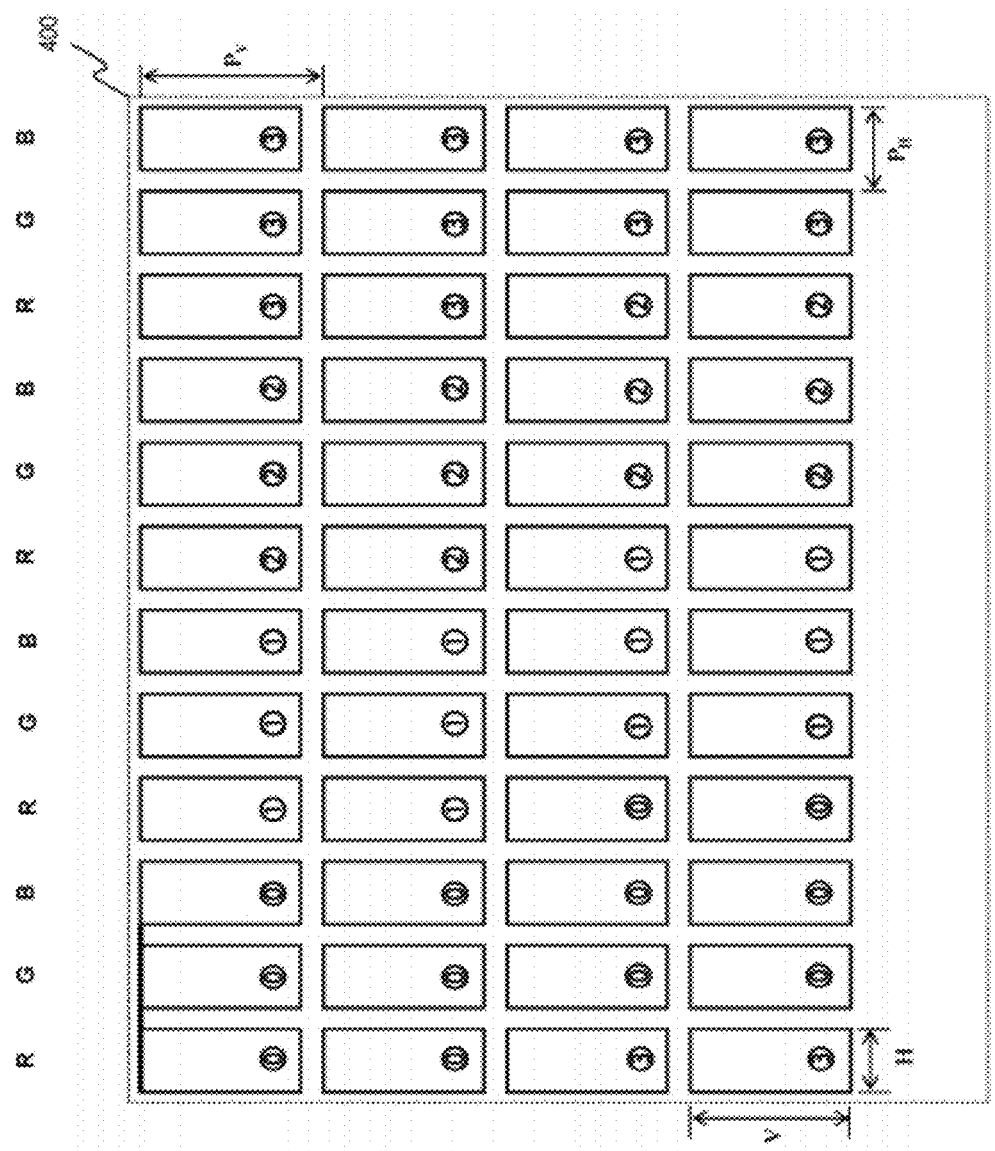
FIG. 27 is a schematic view of a structure of a multi-view combined 3D image according to a fourth embodiment of the present invention.

FIG. 27 is a schematic view of a structure of a multi-view combined 3D image according to a fourth embodiment of the present invention. The multi-view combined 3D image 400 is also generated through the operation of the formula (10), where the values of all related parameters are: n=4, m=3, Q=2, Δ=0, and Π=1. m=3 means that three sub-pixels are used as a unit to form a horizontal smallest display unit (in the U.S. Pat. No. 7,317,494 B2, m=1). Q=2 means that two sub-pixels are used as a unit to form a vertical smallest display unit (in the U.S. Pat. No. 7,317,494 B2, Q=1, but no description about the concept of the vertical smallest display unit is provided).

Figure 28:
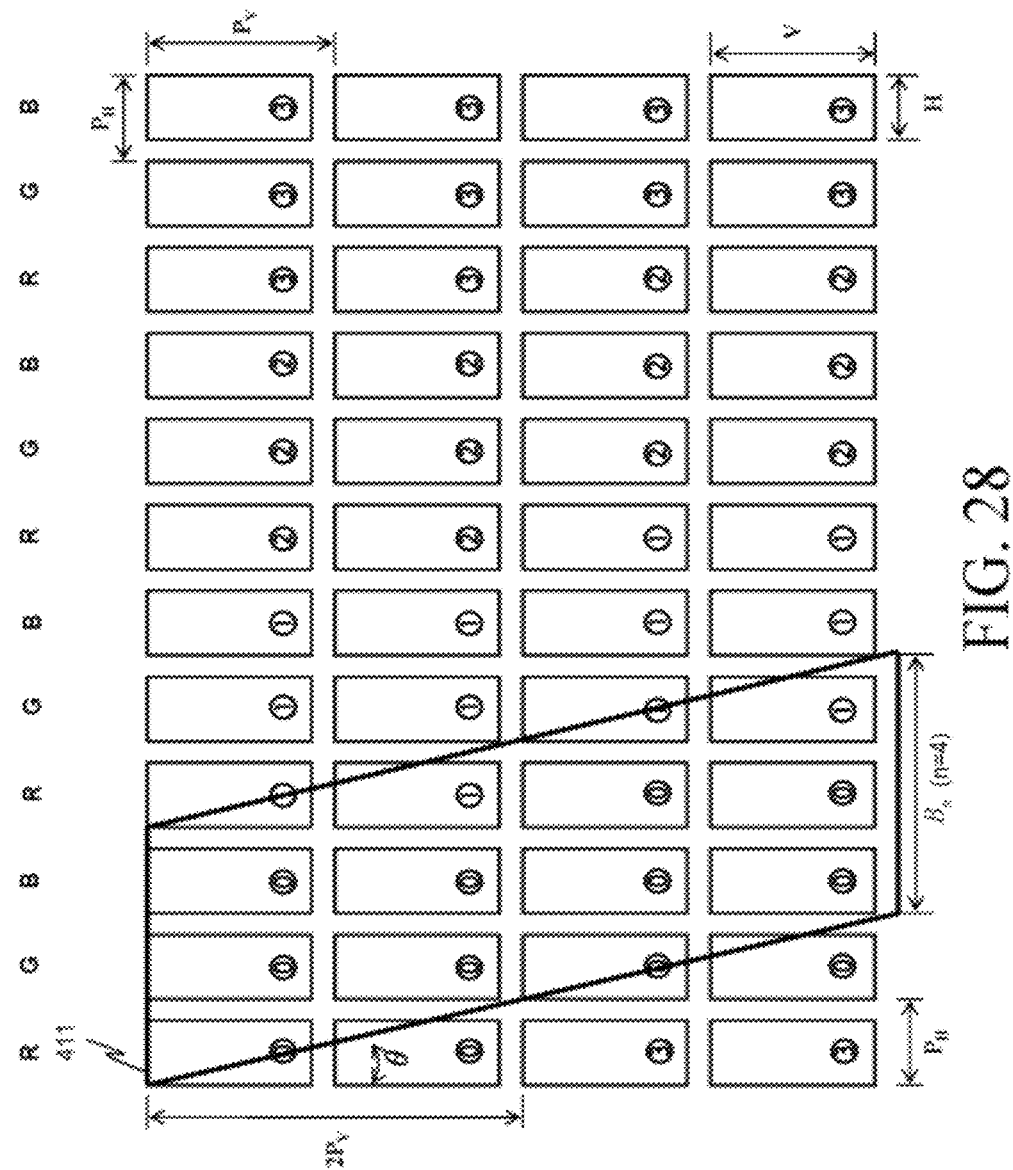
FIG. 28 is a schematic view of a structure of a slantwise strip parallax barrier according to the fourth embodiment of the present invention.

FIG. 28 is a schematic view of a structure of a slantwise strip parallax barrier according to the fourth embodiment of the present invention. The slantwise strip parallax barrier (only a transparent component 411 is shown), as discussed in the third embodiment, is designed and generated through the formulas (15) to (17), where n=4, m=3, and Q'=2. Here, the slant angle θ is defined by the formula (17), which is already completely different from the slant angle as defined in the U.S. Pat. No. 7,317,494 B2.

Figure 29:
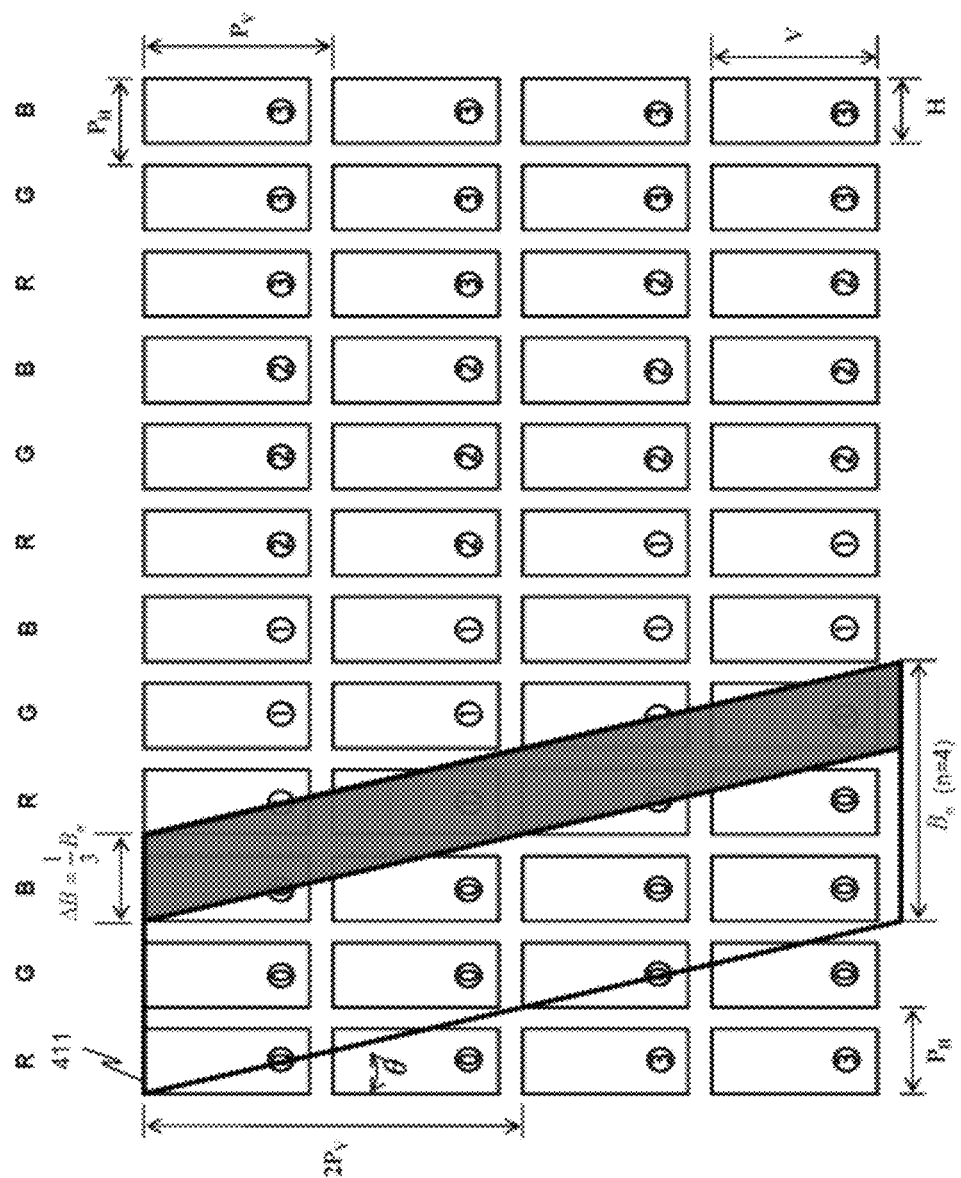
FIG. 29 and FIG. 30 are schematic views of possible reducing amounts of an aperture width of a transparent component according to the fourth embodiment of the present invention.
Figure 30:
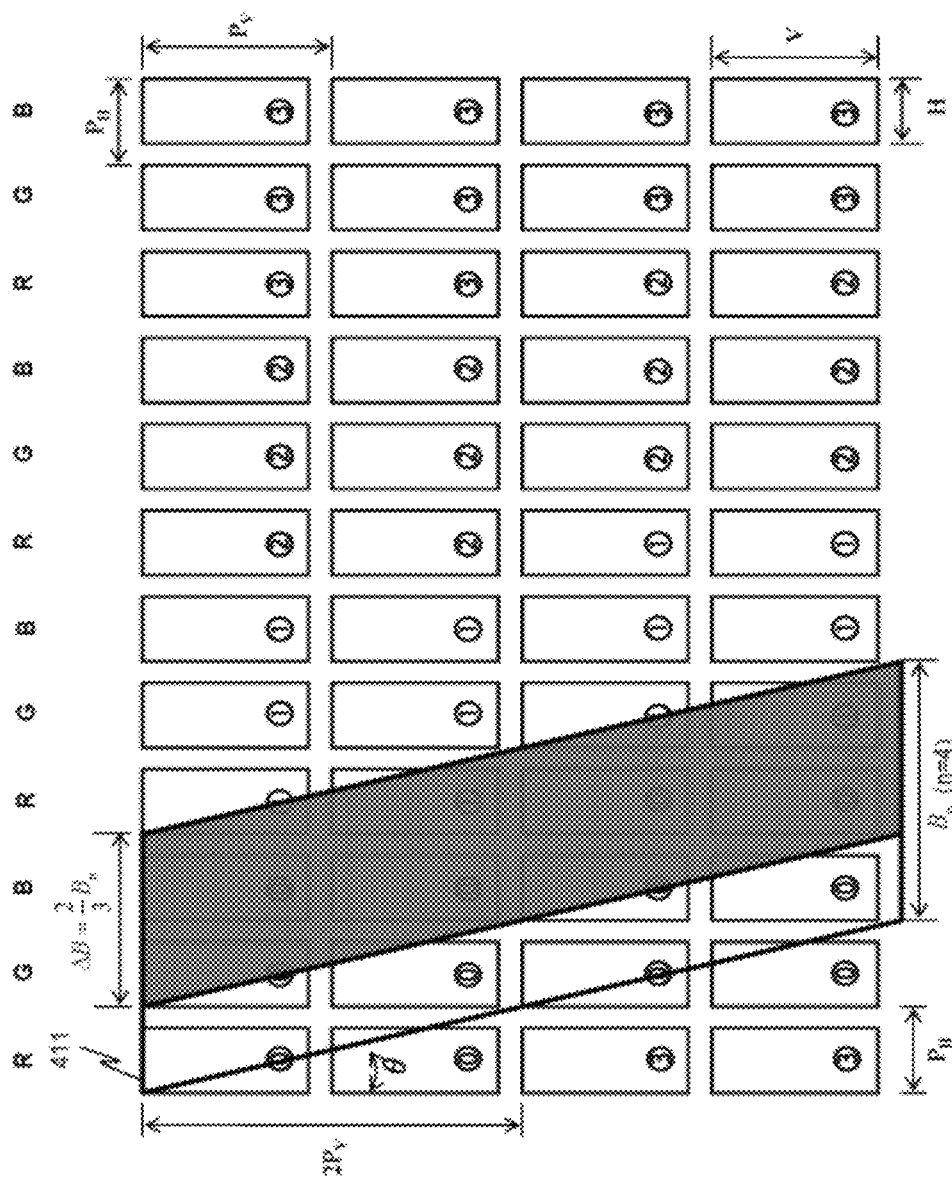

FIG. 29 and FIG. 30 are schematic views of possible reducing amounts of the aperture width of the transparent component according to the fourth embodiment of the present invention. As discussed in the second embodiment, for the method of reducing the aperture width of the transparent component 411, as shown in FIG. 29, the aperture width reducing amount is set to ΔB=(1/m)B$_n$, where m=3, so the objective of effectively solving the direct cross-talk phenomenon is achieved. In addition, as shown in FIG. 30, the aperture width reducing amount is set to ΔB=(⅔)B$_n$, so the phenomenon of asymmetrical left and right viewing freedom is balanced. Accordingly, the value of the aperture width reducing amount ΔB is: ΔB≥(1/m)B$_n$, so the objectives of effectively solving the direct cross-talk phenomenon and balancing the phenomenon of asymmetrical left and right viewing freedom may be achieved at the same time.

Figure 31:
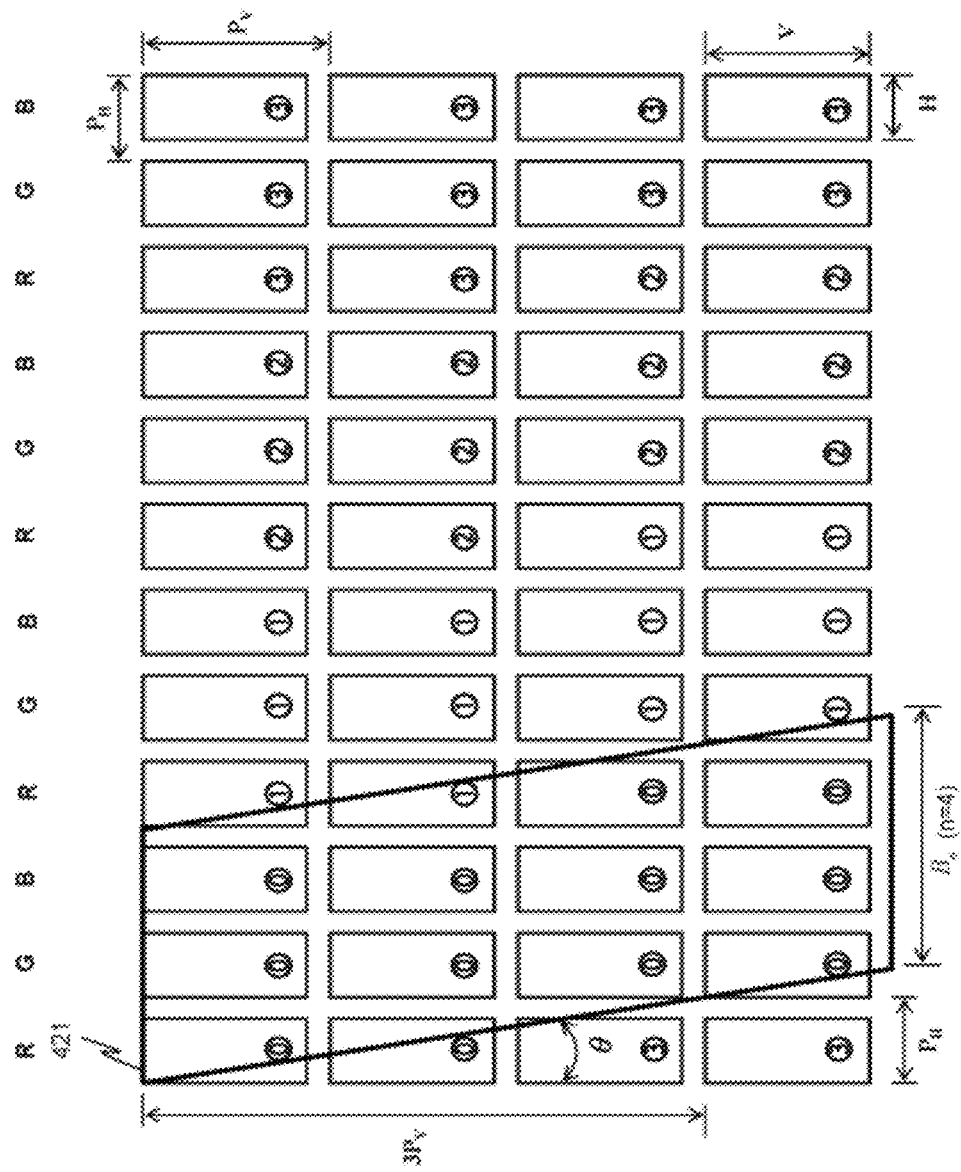
FIG. 31 and FIG. 32 are schematic views of a structure of a slant angle of the slantwise strip parallax barrier according to the fourth embodiment of the present invention.
Figure 32:
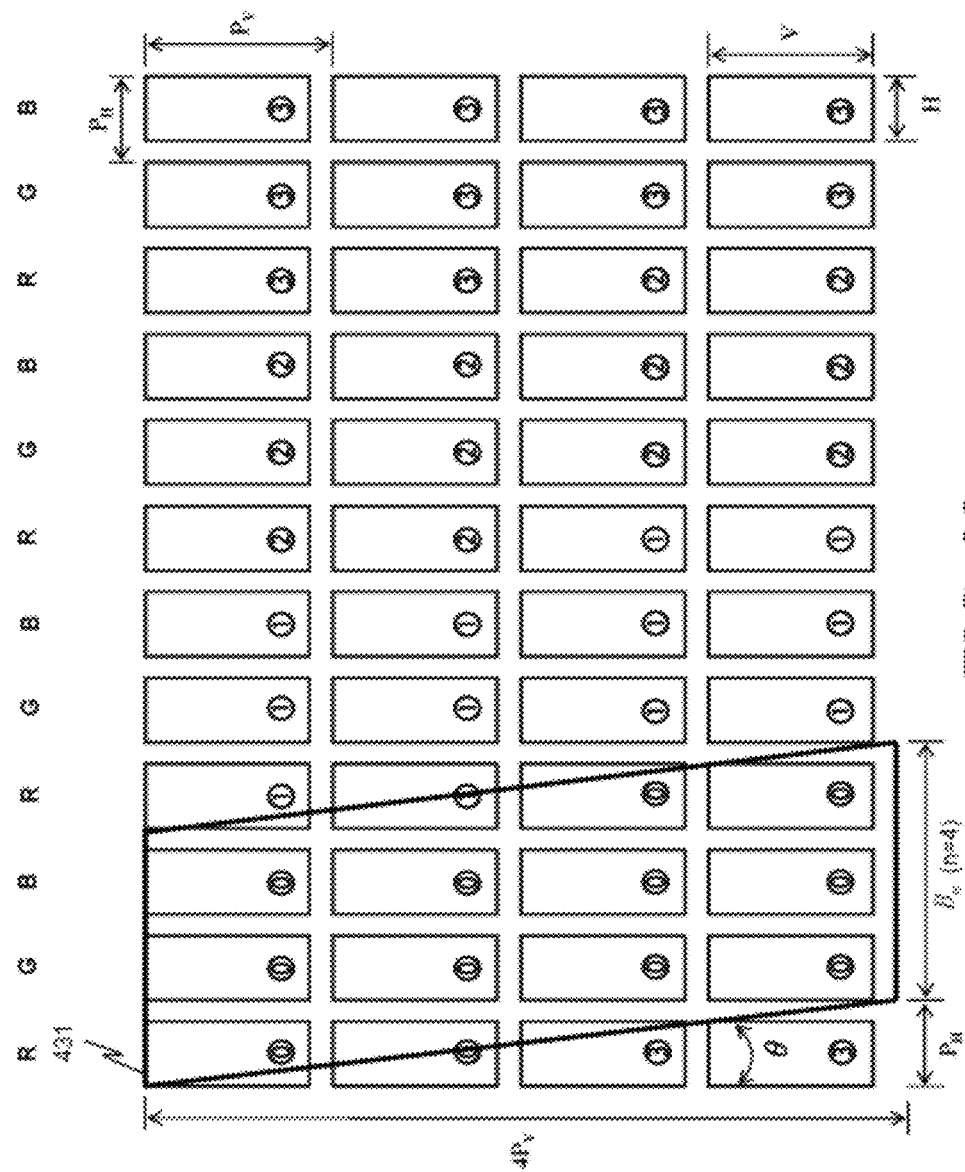

In addition, as discussed in the third embodiment, a slantwise strip parallax barrier structure having a different slant angle may also be designed according to the formula (17), and FIG. 31 and FIG. 32 are schematic views of a structure of a slant angle of a slantwise strip parallax barrier according to the fourth embodiment of the present invention. That is, the value of Q' is set to Q'>2. As shown in FIG. 31, the slant angle θ of the slantwise strip parallax barrier is acquired when Q'=3, that is, θ=tan$^{-1}$[P$_H$/(3P$_V$)]; while as shown in FIG. 32, the slant angle θ of the slantwise strip parallax barrier is acquired when Q'=4, that is, θ=tan$^{-1}$[P$_H$/(4P$_V$)]. In addition, for a slantwise strip parallax barrier having Q'×2, the possible reducing amount (not shown) of the aperture width of the transparent component thereof, as the processing of reducing the aperture width as shown in FIG. 29 to FIG. 30, may also achieve the objectives of effectively solving the direct cross-talk phenomenon and balancing the phenomenon of asymmetrical left and right viewing freedom at the same time.

In conclusion, for an arbitrary number of single view images with a total view number n greater than or equal to 2, when a planar display screen having sub-pixels in horizontal strip configuration and a slantwise strip parallax barrier are used to display a multi-view 3D image, a general law may be summarized according to the embodiments of the present invention for the multi-view 3D image combination and the slantwise strip parallax barrier structure design and optimization, so the objectives of effectively solving the direct cross-talk phenomenon and balancing the phenomenon of asymmetrical left and right viewing freedom may be achieved at the same time.

For a multi-view 3D image combination method, the present invention adopts the formulas (9) and (10), so as to perform combination of a multi-view 3D image for multiple single view images with the total view number n≥2. In addition, for the design of the slantwise strip parallax barrier structure, the present invention adopts the formulas (15) to (17) to design a slantwise strip parallax barrier structure. The values of all parameters in the formulas (10), (15), (16), and (17) may be set as follows: m≥2, Q≥1, Δ=0, Π=1, and Q'≥1. Optimally, as the parameters used in the first embodiment, m=2, Q=1, Δ=0, Π=1, and Q'=1. Optimally, as the parameters used in the second embodiment, m=3, Q=1, Δ=0, Π=1, and Q'=1. Optimally, as the parameters used in the third embodiment, m=2, Q=2, Δ=0, Π=1, and Q'≥2. Optimally, as the parameters used in the fourth embodiment, m=3, Q=2, Δ=0, Π=1, and Q'≥2. In addition, for the aperture width of the transparent component, the value of the aperture width reducing amount ΔB needs to be: ΔB≥(1/m)B$_n$, so the objectives of effectively solving the direct cross-talk phenomenon and balancing the phenomenon of asymmetrical left and right viewing freedom may be achieved at the same time.

In the end, in order to reduce the defect of discontinuous parallax jump, the present invention proposes a multiple multi-view 3D image combination and display method, which is illustrated through a fifth embodiment in the following.

The main feature of the multiple multi-view 3D image combination method as mentioned in the present invention is to display a multiple multi-view combined 3D image with an original slantwise strip parallax barrier structure. For the so-called multiple multi-view combined 3D image, n'(=m×n) single view images are first generated (n' is referred to as a multiple total view number hereinafter), and the processing of the multi-view image combination is then performed on the n' single view images through the formula (10), so as to combine and generate the multiple multi-view combined 3D image.

Figure 1:
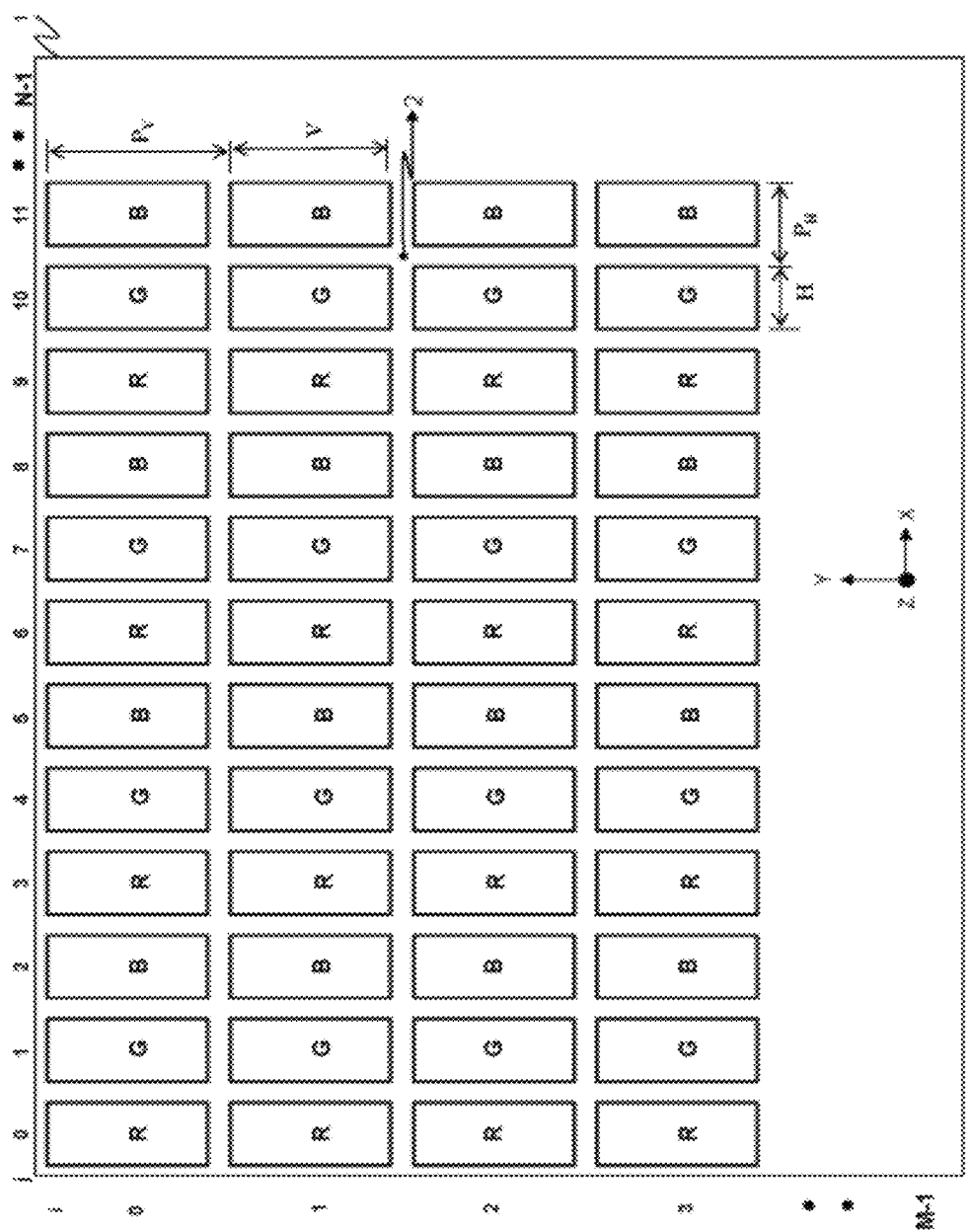
FIG. 1 is a schematic view of a common planar display screen having R, G, and B sub-pixels arranged in horizontal strip configuration.
Figure 2:
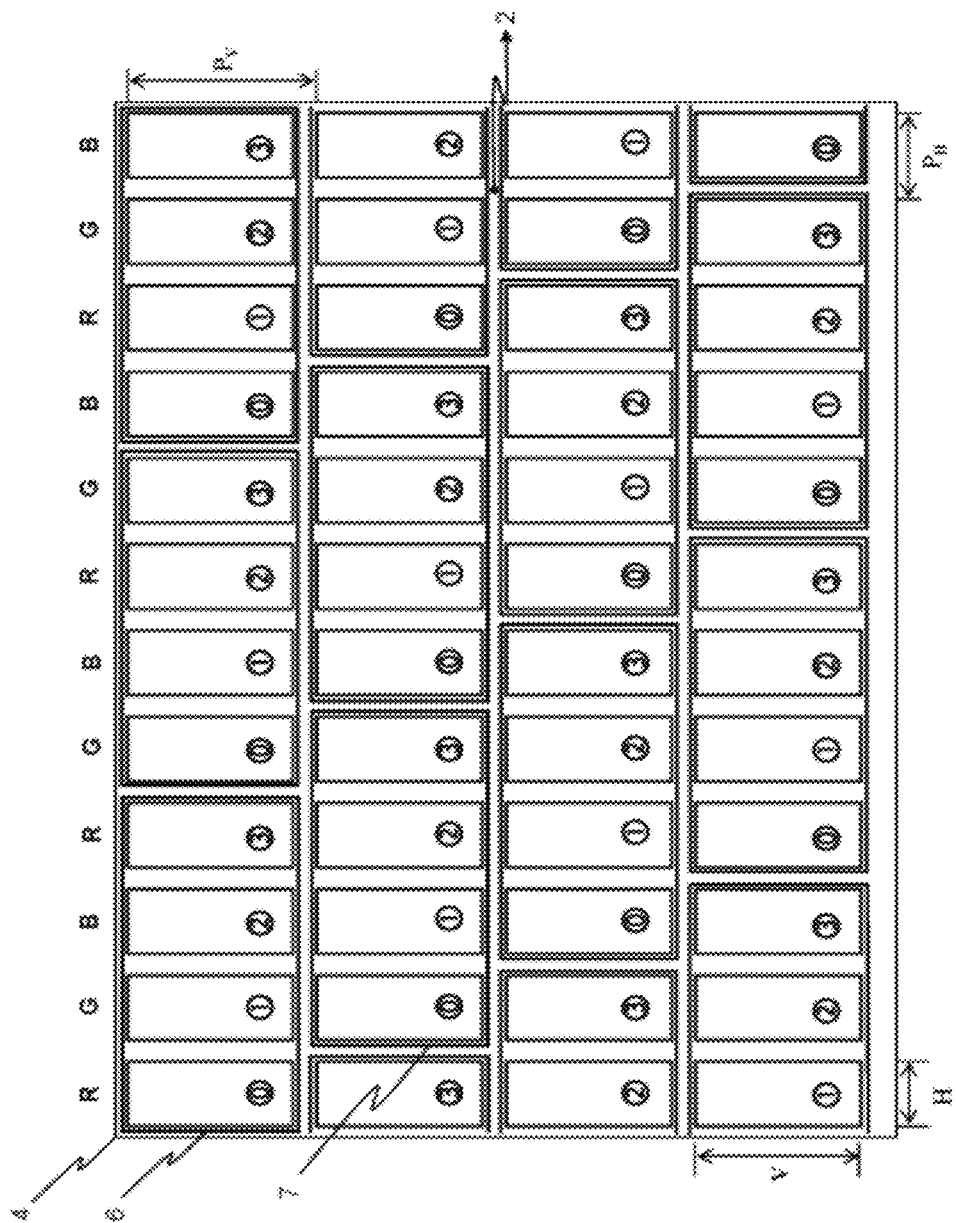
FIG. 2 is a schematic view of a structure of a conventional 4-view combined 3D image.
Figure 3:
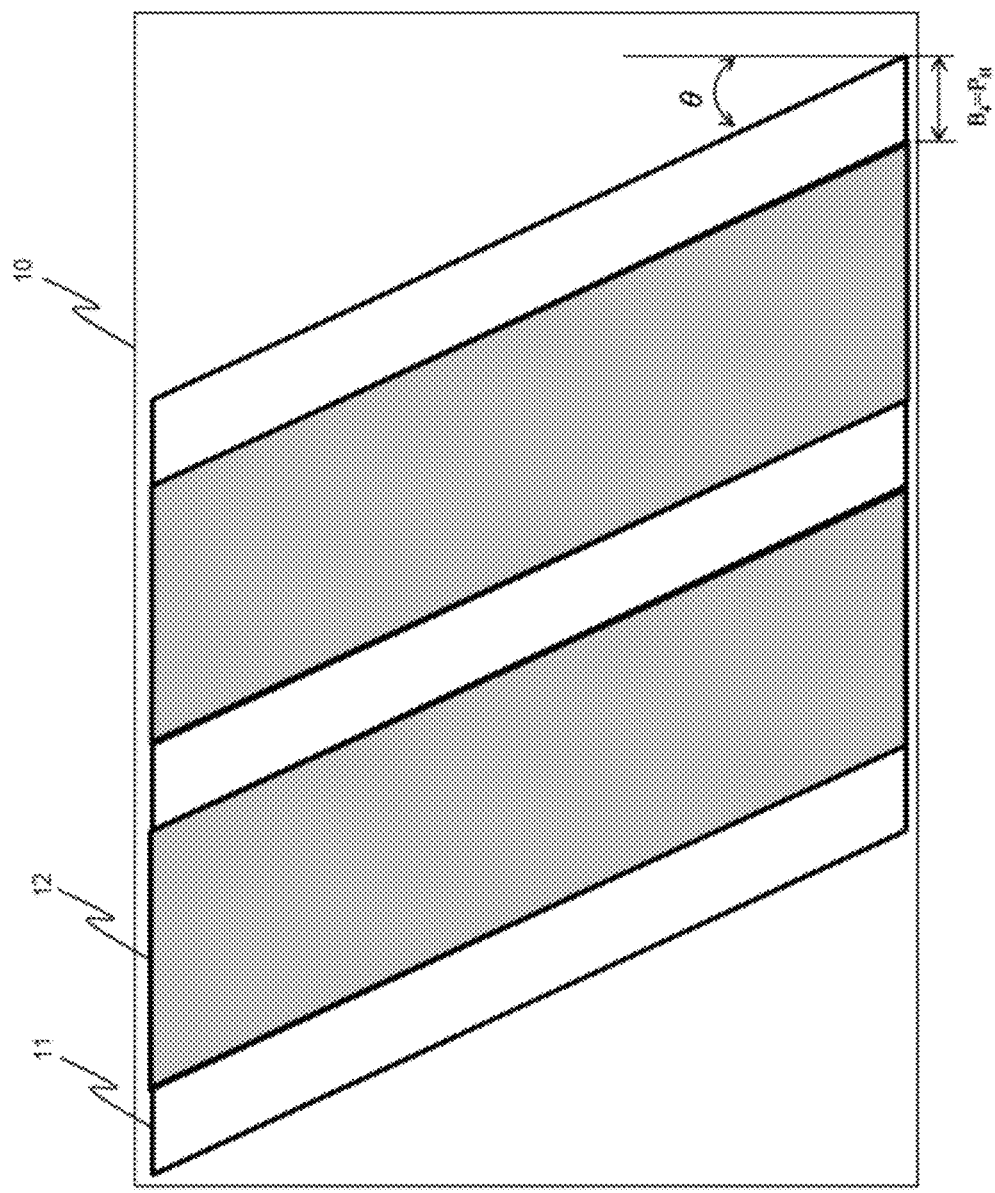
FIG. 3 is a schematic view of a structure of a conventional 4-view slantwise strip parallax barrier.
Figure 4:
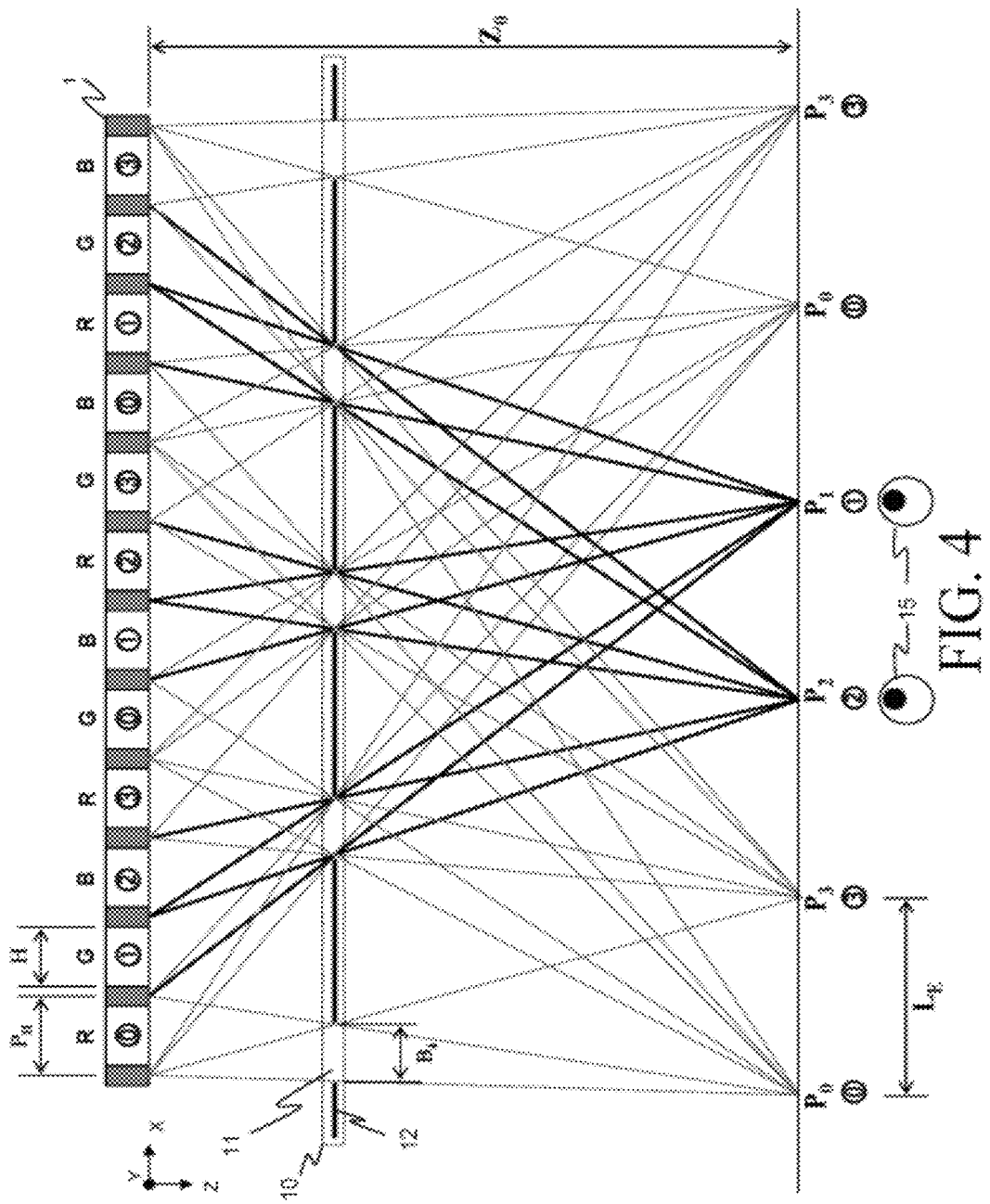
FIG. 4 is a schematic view of display principles of the conventional 4-view combined 3D image.
Figure 5:
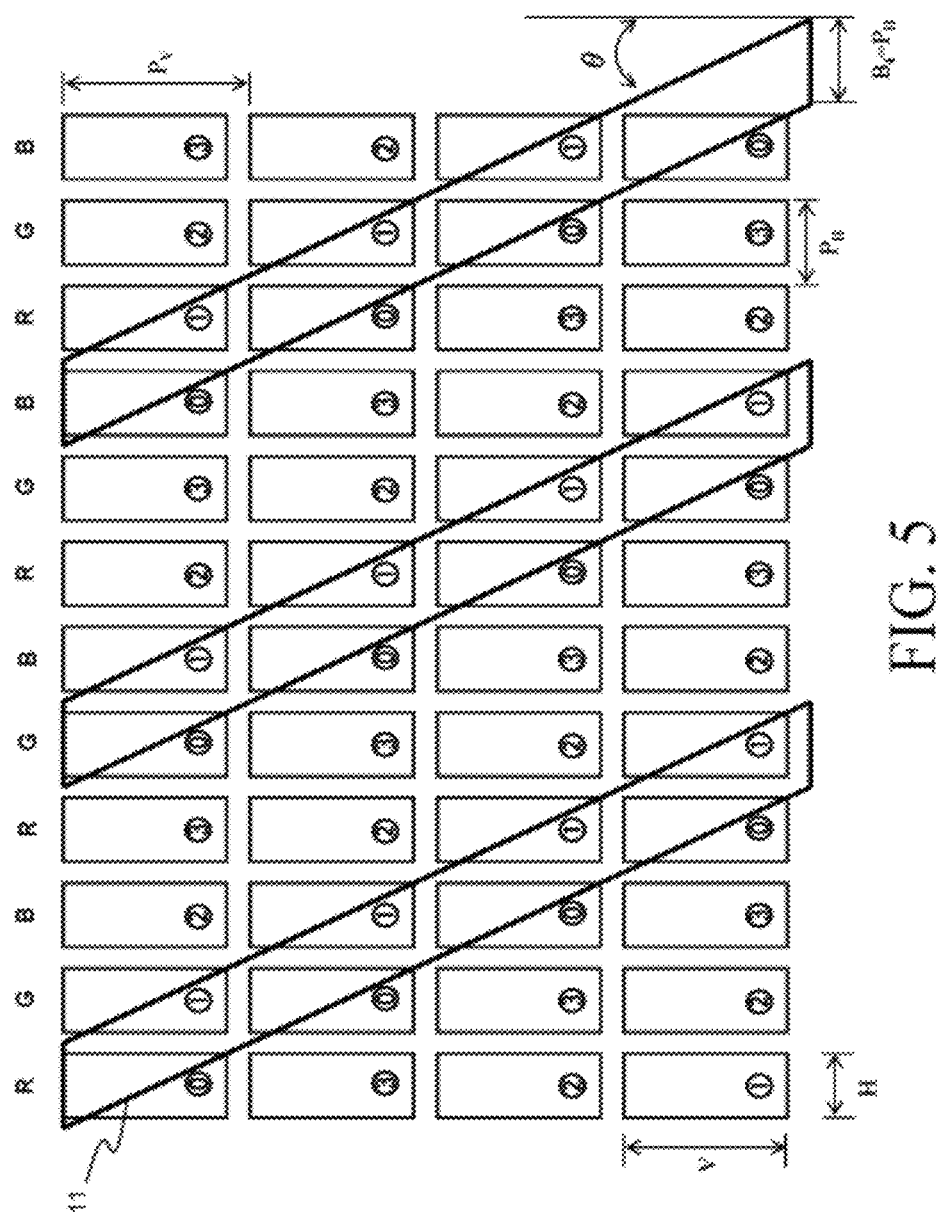
FIG. 5 is a schematic view of a direct cross-talk phenomenon.
Figure 6:
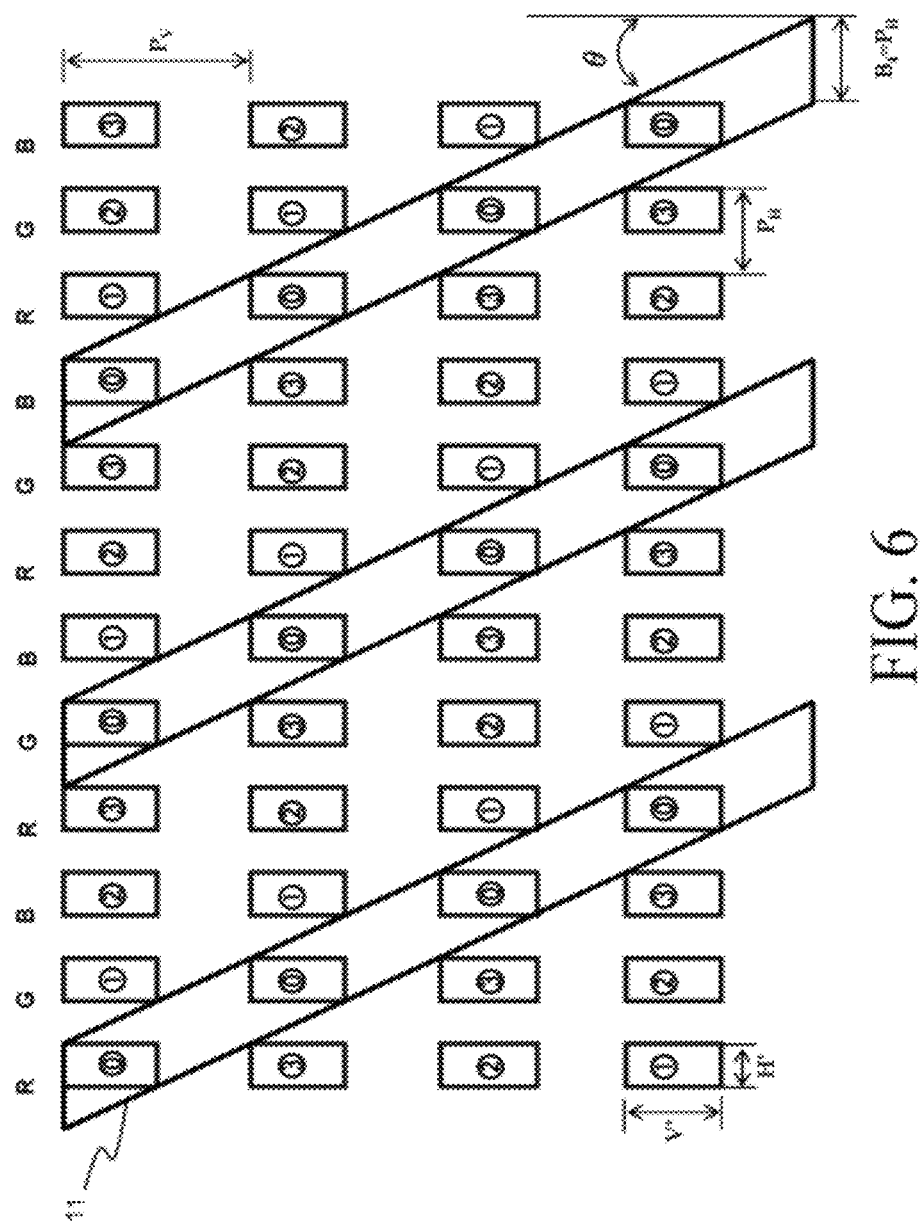
FIG. 6 is a schematic view of a method for solving direct cross-talk in the conventional patent.
Figure 7:
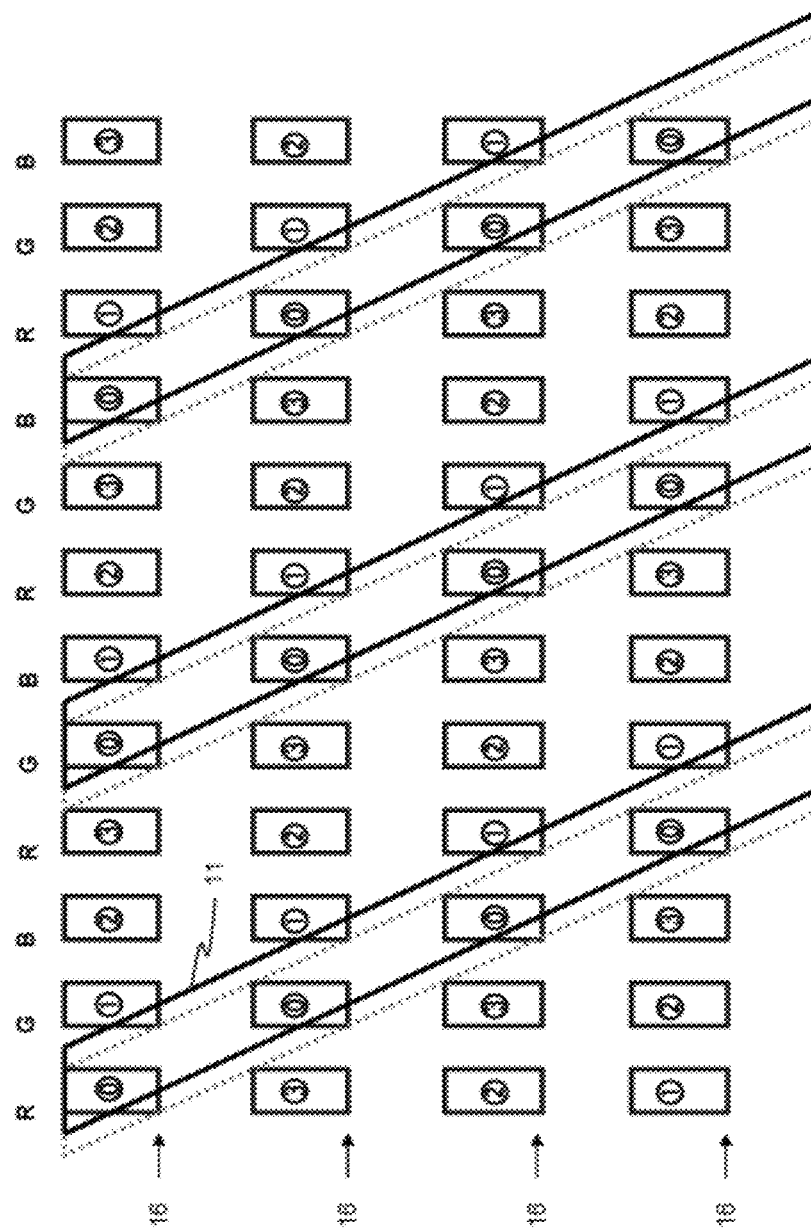
FIG. 7 is a schematic view of changes of relative viewing angles and positions between the parallax barrier and the multi-view combined 3D image when the eyes deviate to the left.
Figure 8:
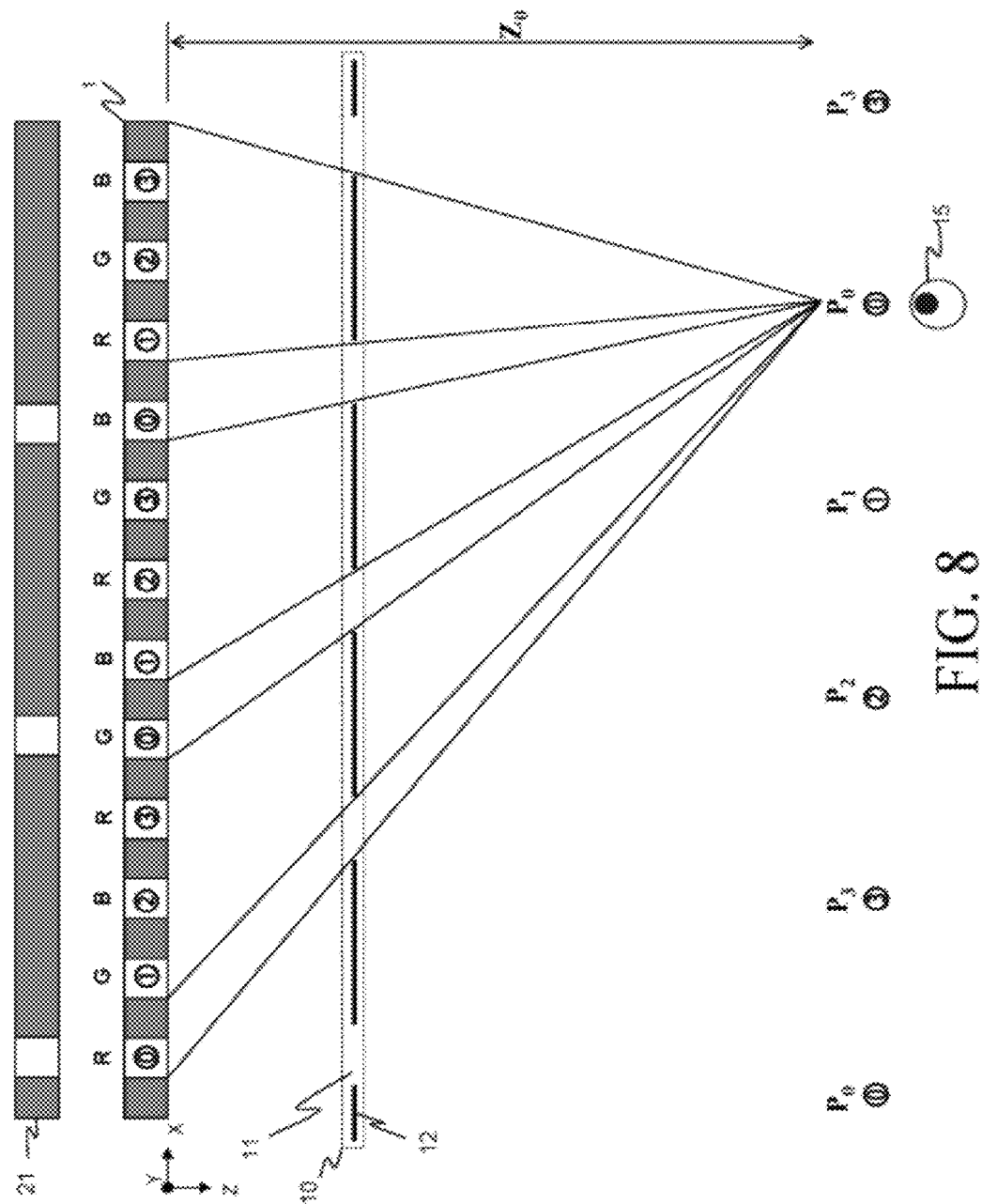
FIG. 8 is a schematic view of a multi-view combined 3D image viewed by the right eye before a viewing position is changed.
Figure 9:
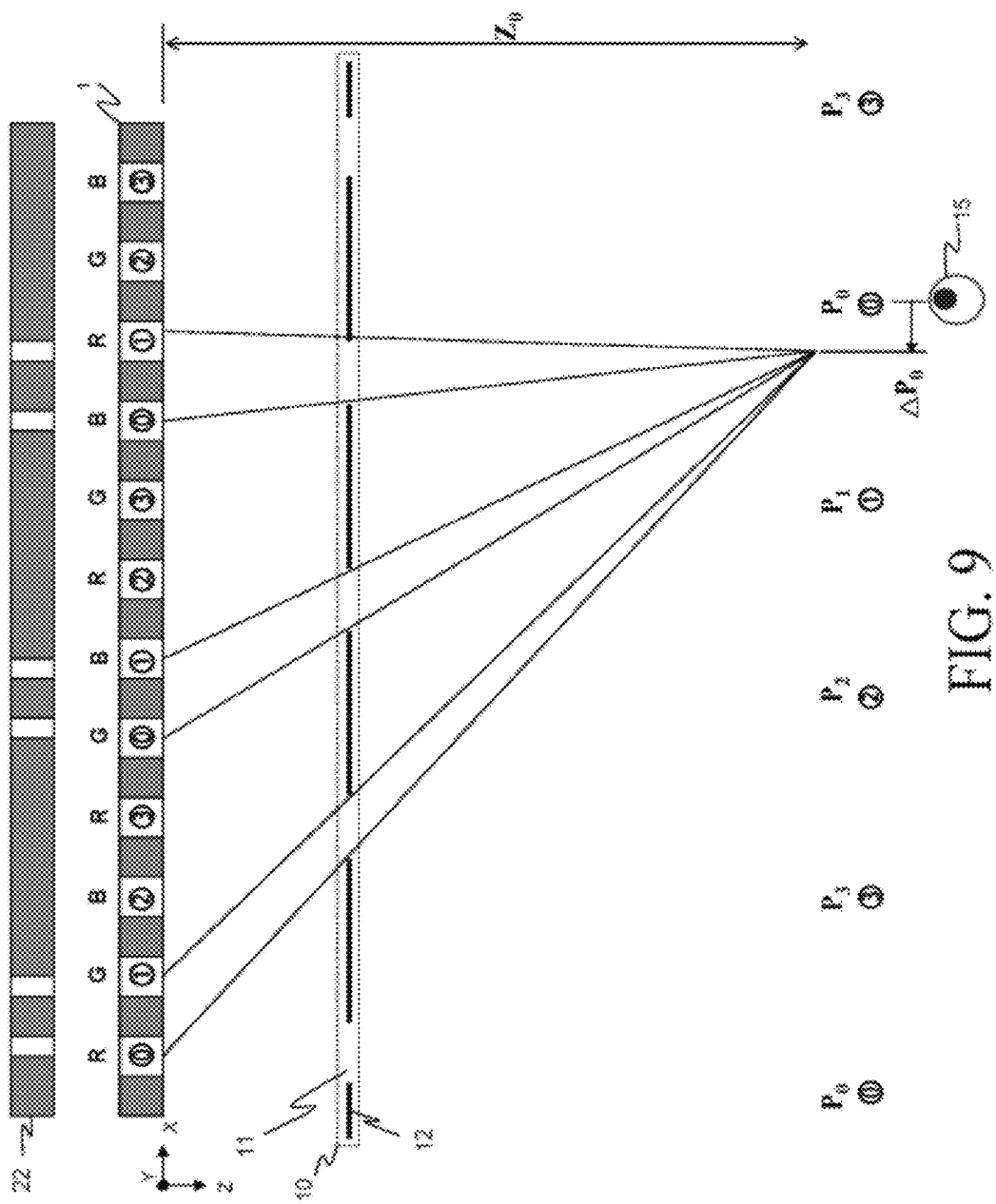
FIG. 9 is a schematic view of a multi-view combined 3D image viewed by the right eye after a viewing position moves to the left.
Figure 10:
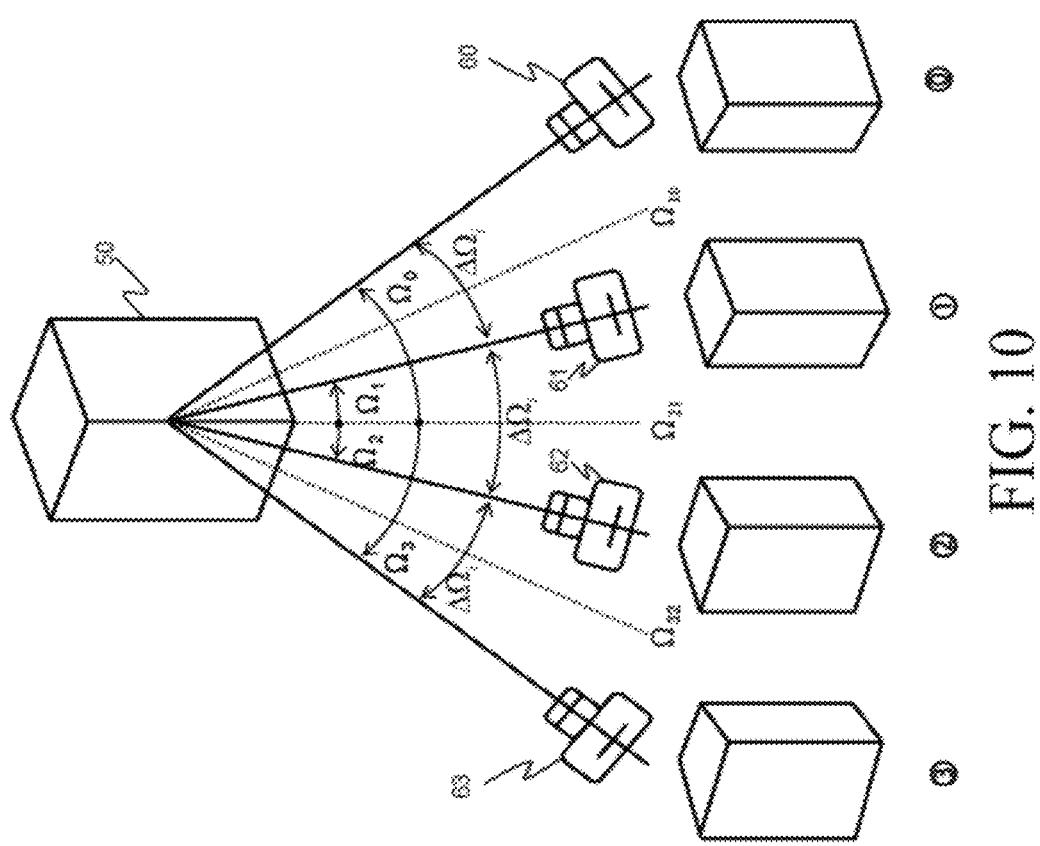
FIG. 10 is a schematic view of the cause of the phenomenon of discontinuous parallax jump.
Figure 33:
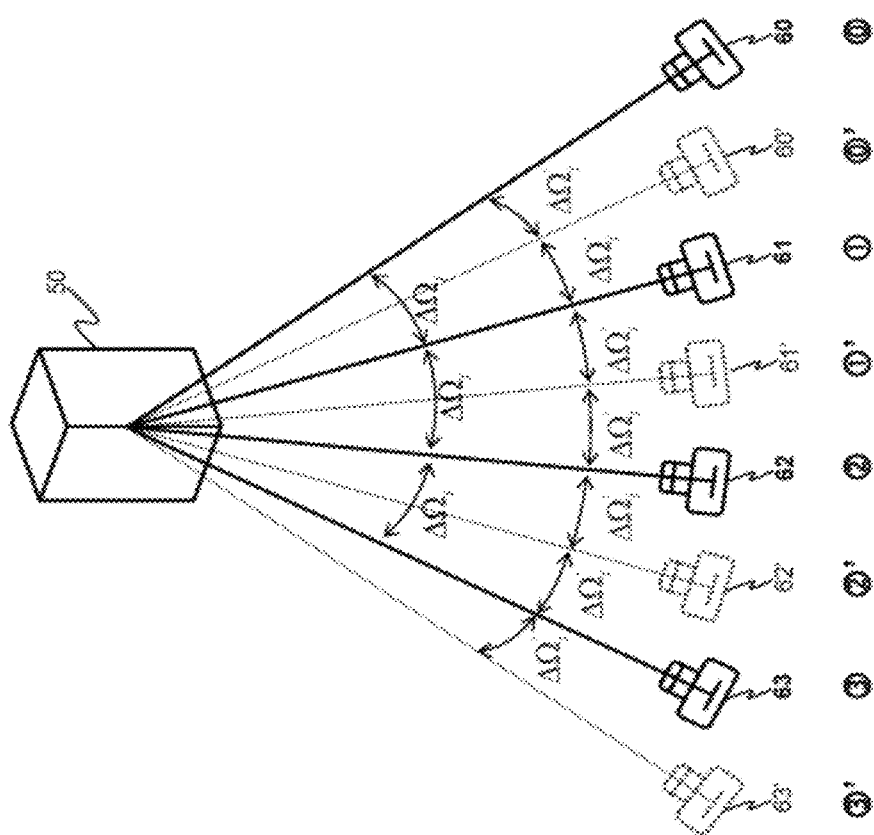
FIG. 33 is a schematic view of generating n'(=8) single views by using convergent 3D photography.

FIG. 33 is a schematic view of acquiring n'(=8) single views by using convergent 3D photography. Compared with the acquisition of single views as shown in FIG. 10, as shown in FIG. 33, although the same convergent 3D photography is adopted, eight cameras 60, 61, 62, 63, 60', 61', 62', and 63' are used to acquire n'(=m×n=2×4=8) single view images ⓪, ⓪', ①, ①', ②, ②', ③, and ③' at an equal shooting-angle ΔΩ$_i$ and with the relation of ΔΩ$_i$'=ΔΩ$_i$/2≠0. That is, for the generation of n'(=m×n=2×4=8) single view images, four single view images ⓪', ①', ②', and ③' are further inserted between the original adjacent single view images ⓪, ①, ②, and ③, so as to achieve the objective of weakening the ΔΩ$_i$'.

Figure 34:
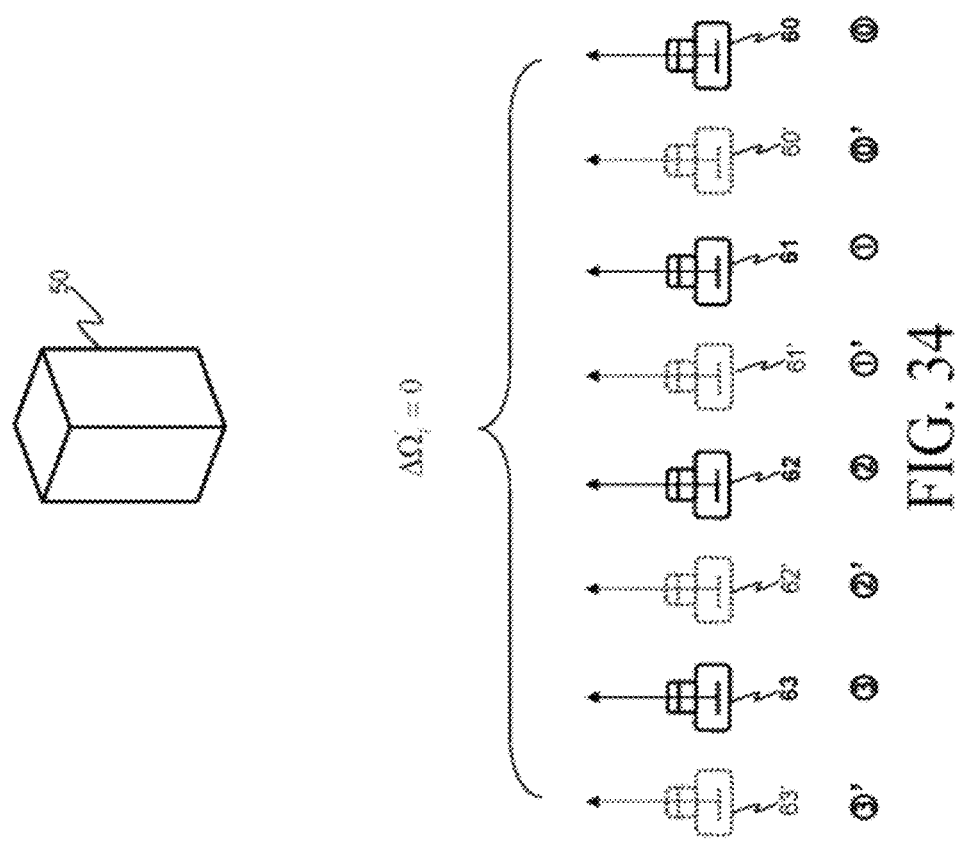
FIG. 34 is a schematic view of acquiring n'(=8) single views by using parallel 3D photography.

In addition, compared with the convergent 3D photography, parallel 3D photography may also be used, so as to acquire n'(=8) single view images. FIG. 34 is a schematic view of acquiring n'(=8) single views by using the parallel 3D photography. In order to simplify installation of the cameras 60, 61, 62, 63, 60', 61', 62', and 63', all the cameras can be made to acquire the n'(=8) single view images ⓪, ①, ②, ③, ⓪', ①', ②', and ③' in a manner of a parallel optical axis. Accordingly, the equal shooting-angle $\Delta\Omega_i'$ may be defined as $\Delta\Omega_i'=0$. Compared with the convergent 3D photography, the parallel 3D photography has the advantage of simple installation engineering, and also does not generate a strong parallax effect for scenes in front of and behind the shot object (not shown), so as to achieve the objective of presenting a 3D image in a relatively soft manner.

Fifth Embodiment

Basically, the fifth embodiment has approximately the same content as the first embodiment, but is an extended application of the first embodiment, and particularly, for the display of a multi-view image with a total view number n greater than 2, the fifth embodiment can reduce the defect of discontinuous parallax jump.

Figure 35:
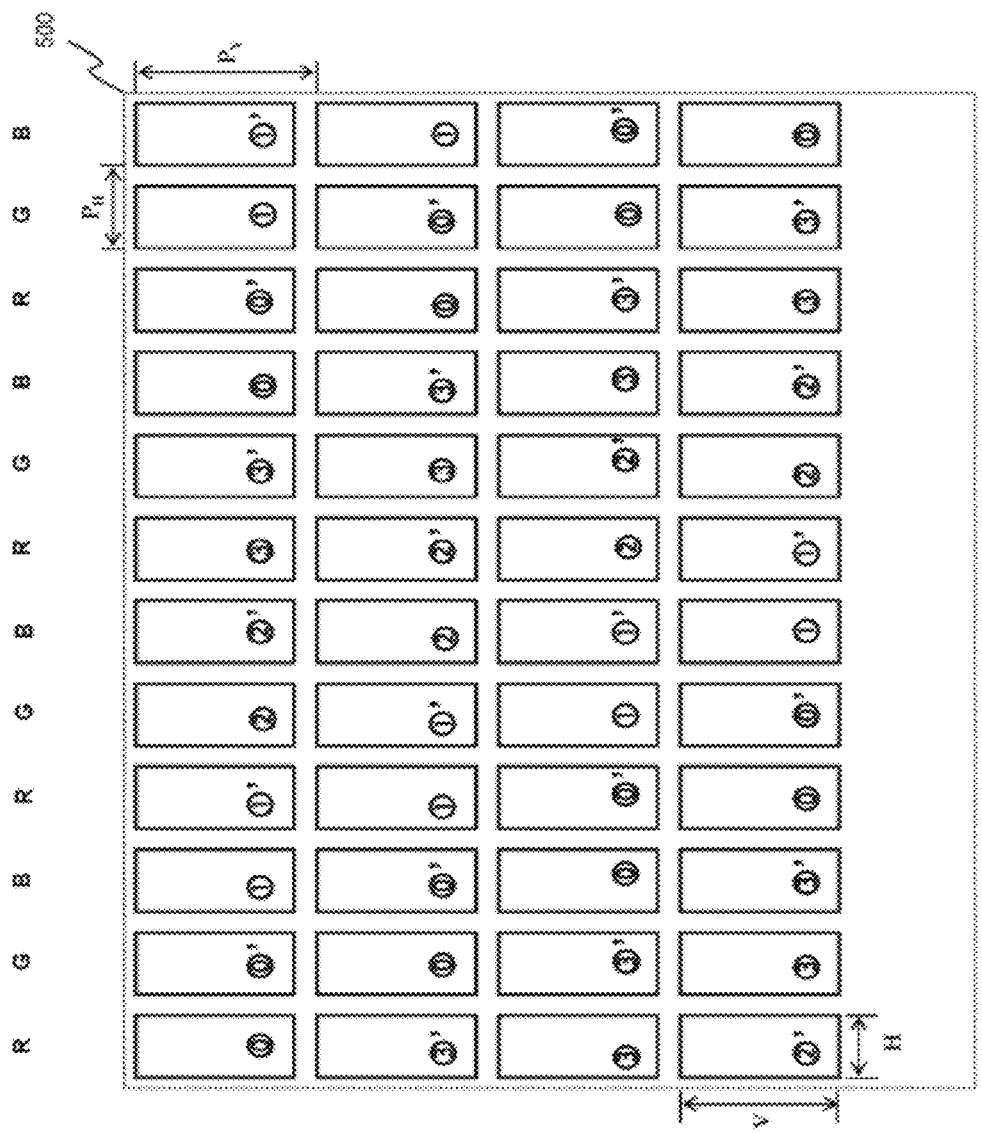
FIG. 35 is a schematic view of a structure of a multiple multi-view combined 3D image according to a fifth embodiment of the present invention.

FIG. 35 is a schematic view of a structure of a multiple multi-view combined 3D image according to the fifth embodiment of the present invention. First, n' single view images $V_k$ are defined as shown in the following formula:

$$V_k = \sum_{i=0}^{M-1} \sum_{j=0}^{N-1} V_k^{i,j}, \quad (18)$$

where M, N, i, j, $V_k^{i,j}$, and k are as defined above, and $0 \le k < n'$. The multiple multi-view combined 3D image $\Sigma_n'500$ is generated through the operation of the following formula for the n' single view images $V_k$:

$$\Sigma_n' = \sum_{i=0}^{M-1} \sum_{j=0}^{N-1} V_\Gamma^{i,j}, \quad (19)$$

where $\Gamma$ is a view number, generated through the operation with the following formula:

$$\Gamma = \text{Mod}\left[\text{int}\left(j - \Pi \times \text{int}\left(\frac{i+\Delta}{Q}\right)\right), n'\right], \quad (20)$$

where n'=m×n=8, n=4, m=2, Q=1, $\Delta=0$, and $\Pi=1$.

Figure 36:
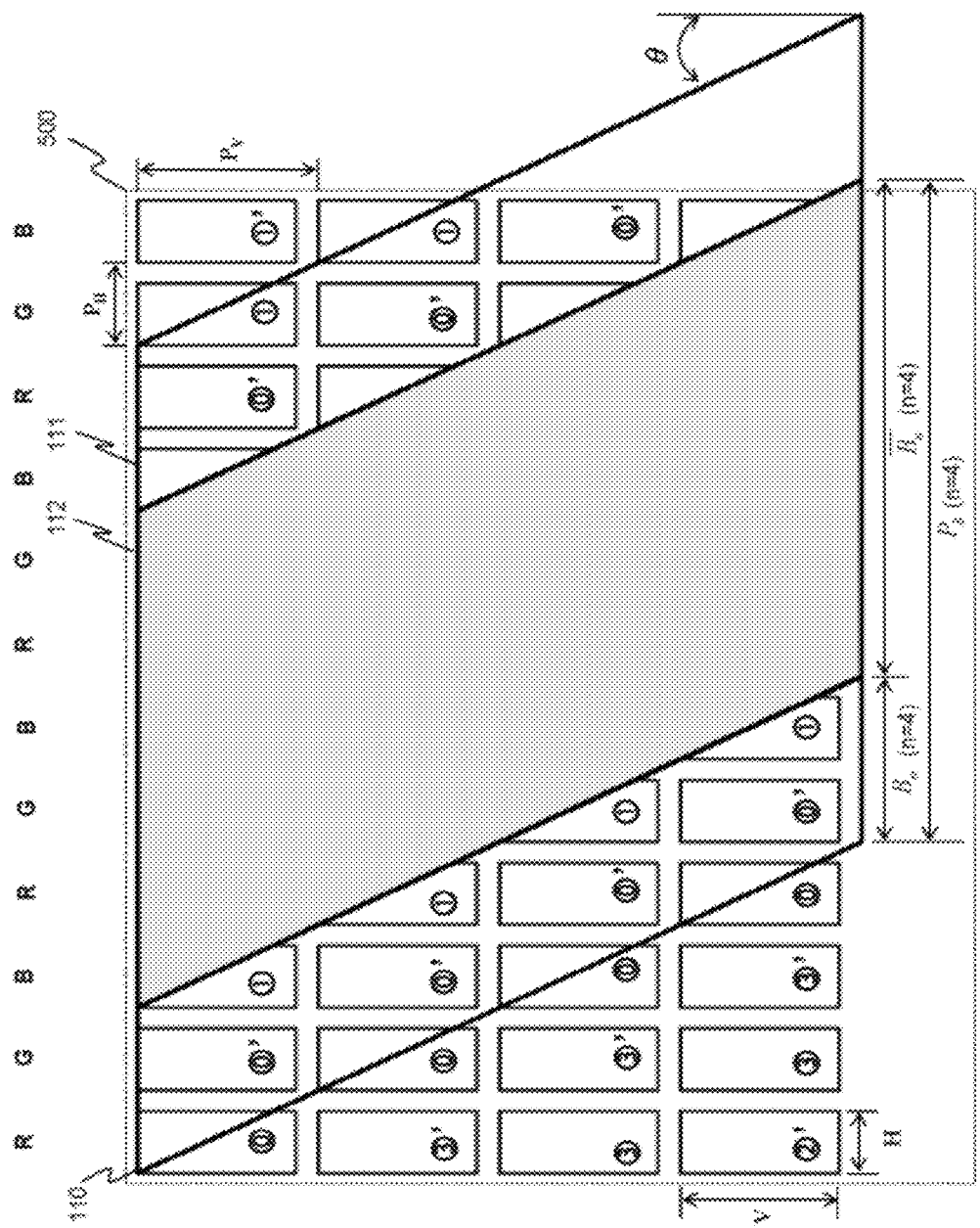
FIG. 36 is a schematic view of a structure of a slantwise strip parallax barrier according to the fifth embodiment of the present invention.

FIG. 36 is a schematic view of a structure of a slantwise strip parallax barrier according to the fifth embodiment of the present invention. The slantwise strip parallax barrier 110 is designed and generated through the formulas (15) to (17), and $B_n$, $\overline{B}_n$, and θ as defined above, where n=4, m=2, and Q'=1. That is, the slantwise strip parallax barrier used in this embodiment has completely the same structure as the slantwise strip parallax barrier in the first embodiment, which is a parallax barrier with the display n=4.

Figure 37:
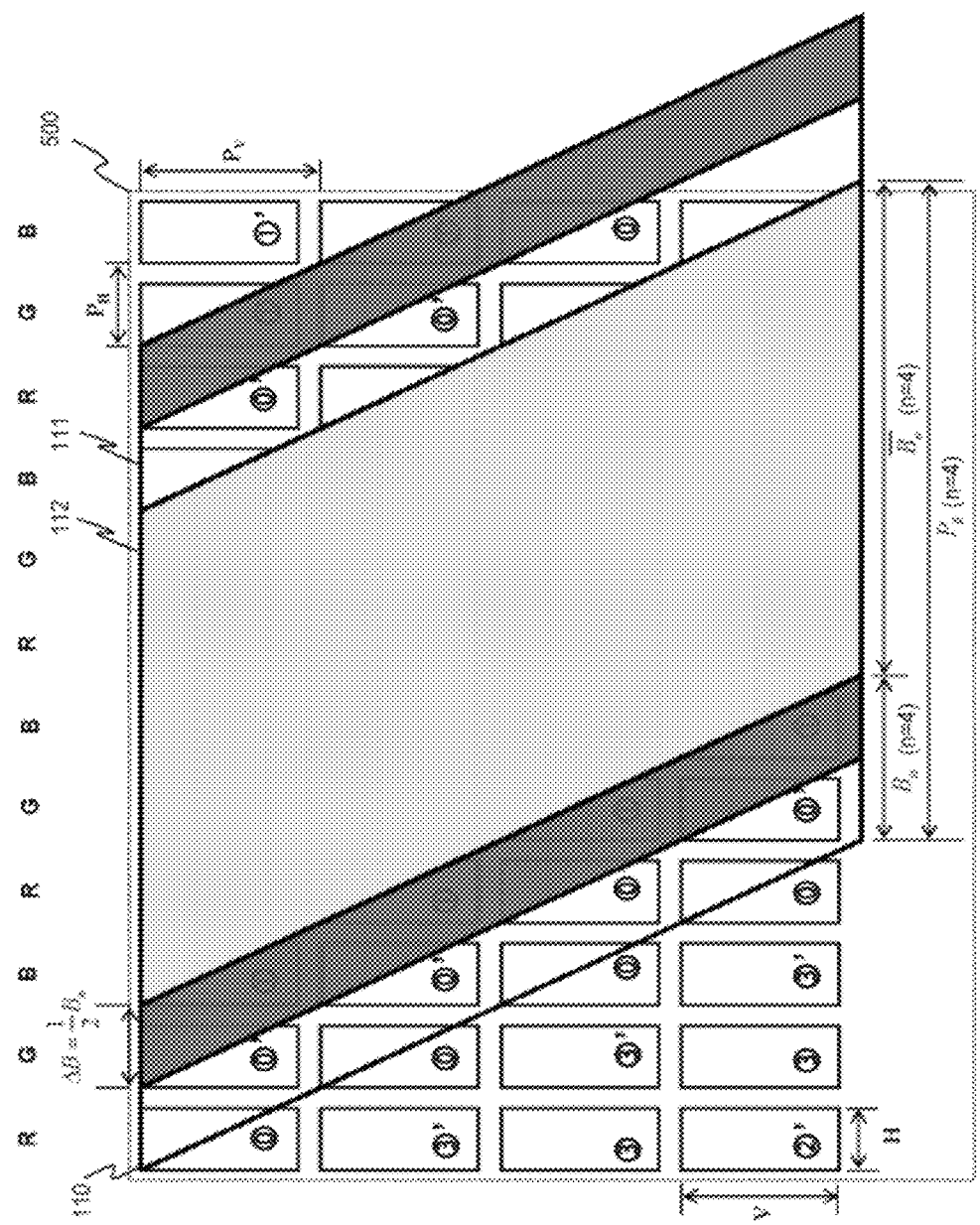
FIG. 37 is schematic views of possible reducing amounts of an aperture width of a transparent component according to the fifth embodiment of the present invention.

FIG. 37 is a schematic view of a possible reducing amount of the aperture width of the transparent component according to the fifth embodiment of the present invention. The aperture width reducing amount may be shown in the following formula:

$$\Delta B = [(m-1)/m]B_n \quad (21),$$

where m=2, and thus $\Delta B = B_n/2$. Therefore, the objective of displaying the multiple multi-view combined 3D image 500 may be achieved. In addition, the formula (21) is also applicable to the other embodiments of the present invention, for the slantwise strip parallax barrier with m=3, as in the second and fourth embodiments, the aperture width reducing amount of the transparent component is $\Delta B = (2B_n)/3$.

Figure 38:
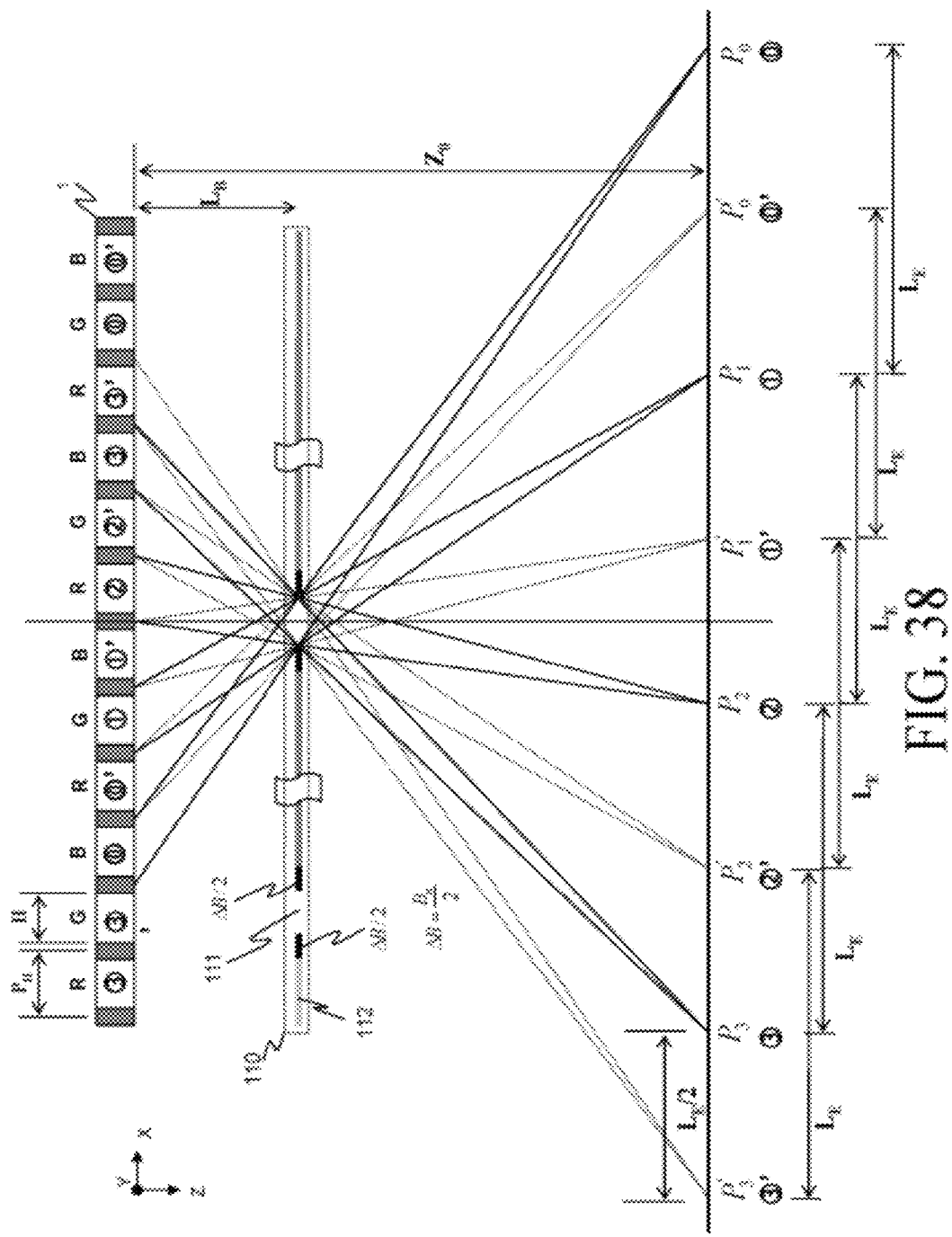
FIG. 38 is a schematic view related to display of a multiple multi-view combined 3D image according to the fifth embodiment of the present invention.

FIG. 38 is a schematic view related to display of a multiple multi-view combined 3D image according to the fifth embodiment of the present invention. As discussed in FIG. 37, the transparent component 111 with the aperture width that is already reduced to $\Delta B = [(m-1)/m]B_n$ (for example, $\Delta B = B_n/2$), at the optimum viewing points $P_3'$, $P_3$, $P_2'$, $P_2$, $P_1'$, $P_1$, $P_0'$, and $P_0$ on the optimum viewing distance $Z_O$, the effect of view separation may be performed on the multiple multi-view combined 3D image 500, so single view images ③', ③, ②', ②, ①', ①, ⓪', and ⓪ without cross-talk may be respectively viewed at the optimum viewing points. In addition, a distance between the adjacent two optimum viewing points is $L_E/m$, and m=2. Accordingly, the viewer may view seven groups of 3D images such as (③', ②'), (③, ②), (②', ①'), (②, ①), (①', ⓪'), and (①, ⓪) on the optimum viewing distance $Z_O$. When the viewer changes the optimum viewing position thereof, the discontinuous parallax jump perceived by the viewer is weakened from $\Delta\Omega_i$ in the first embodiment to $\Delta\Omega_i'$. Therefore, the defect of discontinuous parallax jump may be reduced. Theoretically, when m is infinitely large, the phenomenon of discontinuous parallax jump may be completely solved.

Figure 39:
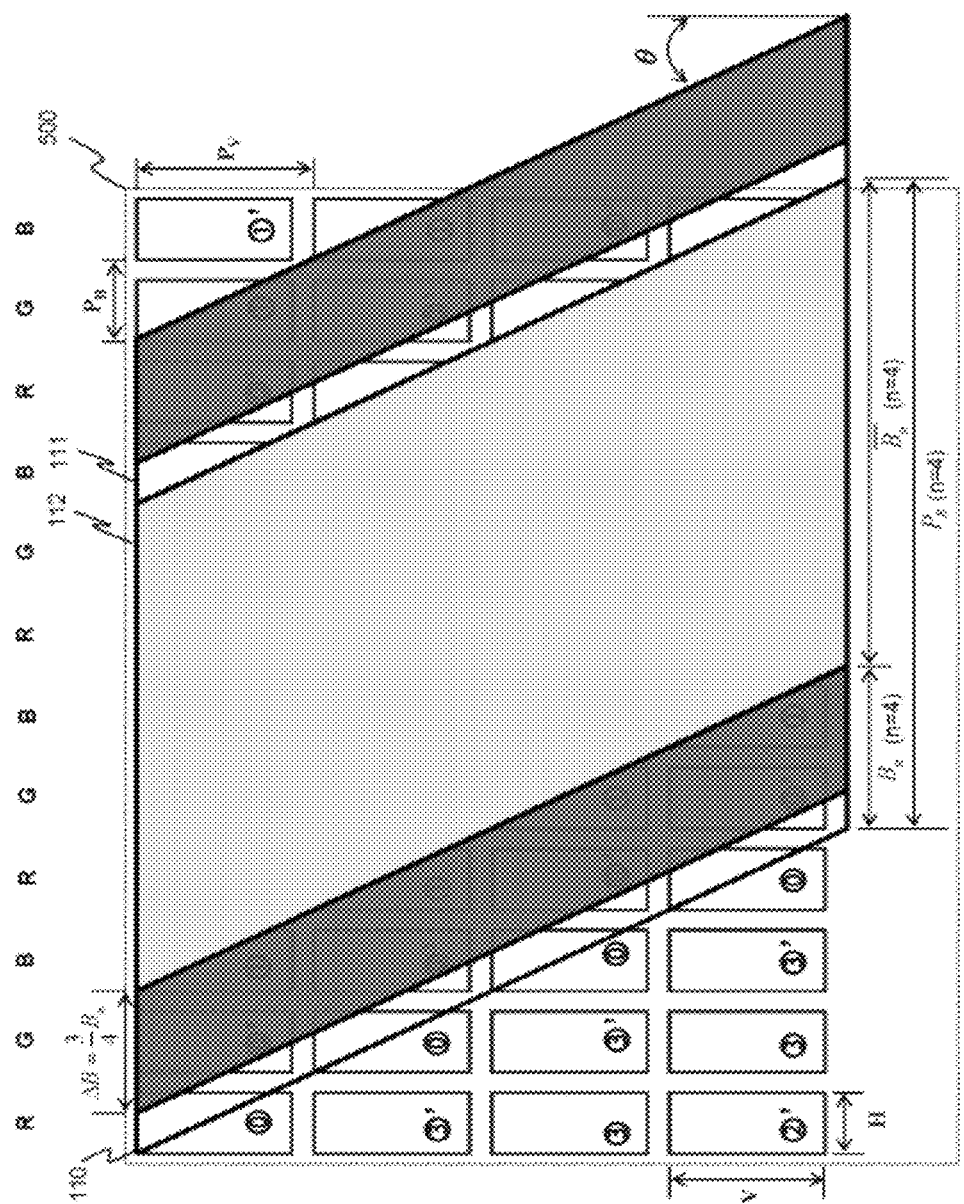
FIG. 39 is schematic views of possible reducing amounts of an aperture width of a transparent component according to the fifth embodiment of the present invention.

FIG. 39 is a schematic view of another reducing amount of the aperture width of the transparent component according to the fifth embodiment of the present invention. The aperture width reducing amount $\Delta B$ may be properly increased, for example, increased to $\Delta B = (\frac{3}{4})B_n$, or greater, for example, $\Delta B > (\frac{3}{4})B_n$. Therefore, the objectives of solving the direct cross-talk and balancing the phenomenon of asymmetrical left and right viewing freedom are achieved. Accordingly, the value of the aperture width reducing amount $\Delta B$ needs to be set to: $\Delta B \ge [(m-1)/m]B_n$, so the objectives of alleviating the defect of discontinuous parallax jump, effectively solving the direct cross-talk phenomenon and balancing the phenomenon of asymmetrical left and right viewing freedom may be achieved at the same time.

In conclusion, for the display of the multi-view image with the total view number n greater than 2, in order to reduce the defect of discontinuous parallax jump, the main feature of the solution proposed in the present invention is to display a multiple multi-view combined 3D image formed of n' single view images with a n-view slantwise strip parallax barrier structure. The relation between n' and n is n'=m×n. The practical implementation method is to acquire the multiple multi-view combined 3D image through the operation by using the formulas (19) and (20). Finally, through the method of reducing the aperture width of the transparent component by using the formula (21), the objective of displaying the multiple multi-view combined image is achieved.

The above descriptions are merely preferred embodiments of the present invention, and are not intended to limit the scope of the present invention. Various modifications and variations made within the appended claims of the present invention shall fall within the scope of the invention. Especially, the formulas of the multi-view 3D image combination, the design of the slant weight of the slantwise strip parallax barrier, and the combination and display of the multiple multi-view 3D image disclosed in the present invention are also applicable to a planar display screen having R, G, and B sub-pixels in vertical strip configuration, and applicable to the method for displaying a 3D image by using a lenticular lens array. Thus, we will be most grateful if a patent right is granted upon careful examination of the Examiner.

What is claimed is:

1. A multi-view 3D image display method, mainly comprising:
   a planar display screen having sub-pixels in strip configuration, for displaying a multi-view combined 3D image $\Sigma_n$, wherein the screen is formed of (N×M) R, G, and B sub-pixels, N is a total number of sub-pixels in a horizontal direction of the screen; M is a total number of sub-pixels in a vertical direction of the screen; j and i are respectively indexes of a horizontal position and a vertical position of a single sub-pixel, $0 \leq j \leq N-1$, and $0 \leq i \leq M-1$, the R, G, and B sub-pixels have a feature of strip configuration, and the single sub-pixel has a size of $P_H \times P_V$, where $P_H$ is a horizontal width of the sub-pixel, and $P_V$ is a vertical height of the sub-pixel;
   n single view images $V_k$, wherein a feature of an equal shooting-angle exists between the adjacent single view images, and each of the single view images $V_k$ is represented by the following formula:

$$V_k = \sum_{i=0}^{M-1} \sum_{j=0}^{N-1} V_k^{i,j}, \quad (1)$$

where n is a total view number, and $n \geq 2$; M, N, i, and j are as defined above, k is a view number, and $0 \leq k < n$; and $V_k^{i,j}$ is image data of a sub-pixel at a position (i,j) in the single view image $V_k$;
   a multi-view combined 3D image $\Sigma_n$, formed of the n single view images, and generated through a multi-view 3D image combination method, wherein the multi-view combined 3D image $\Sigma_n$ is represented by the following formula:

$$\Sigma_n = \sum_{i=0}^{M-1} \sum_{j=0}^{N-1} V_\Lambda^{i,j}, \quad (2)$$

where M, N, i, and j are as defined above, $\Lambda$ is a view number, and $0 \leq \Lambda < n$;
   a multi-view 3D image combination method, comprising calculating the view number $\Lambda$ through the following formula, and generating the multi-view combined 3D image $\Sigma_n$:

$$\Lambda = \text{Mod}\left[\text{int}\left(\frac{j - \Pi \times \text{int}\left(\frac{i+\Delta}{Q}\right)}{m}\right), n\right], \quad (3)$$

where i, j, and n are as defined above, m is a number of sub-pixels in a horizontal smallest display unit; Q is a number of sub-pixels in a vertical smallest display unit; $\Delta$ is a horizontal displacement phase; $\Pi$ is a horizontal displacement amplitude, values of all parameters in the formula (3) are: $m \geq 2$, $Q \geq 1$, $\Delta = 0$, and $\Pi = 1$; and int is a function of rounding, and Mod is a function of taking a remainder;
   a slantwise strip parallax barrier, for performing an effect of view separation on the multi-view combined 3D image $\Sigma_n$ at multiple optimum viewing points on an optimum viewing distance, so as to respectively display a single view image without cross-talk, wherein a distance between the adjacent optimum viewing points is equal to an interpupillary distance (IPD) $L_E$, a structure of the slantwise strip parallax barrier is mainly formed of a plurality of slantwise strip transparent components and a plurality of slantwise strip opaque components, a slantwise strip parallax barrier structure design method is used to design and acquire an aperture width $B_n$ of the transparent component, an opaque width $\overline{B}_n$ of the opaque component, and a slant angle $\theta$; a slantwise strip parallax barrier structure optimization method is used to design and acquire an aperture width reducing amount $\Delta B$, and through the reduction of the aperture width reducing amount $\Delta B$ introduced to the aperture width $B_n$ of the transparent component, so the objectives of solving a direct cross-talk phenomenon and balancing a phenomenon of asymmetrical left and right viewing freedom are achieved;
   the slantwise strip parallax barrier structure design method, comprising calculating an aperture width $B_n$ of the transparent component, an opaque width $\overline{B}_n$ of the opaque component, and a slant angle $\theta$ through the following formulas:

$$B_n = \frac{mP_H L_E}{mP_H + L_E}, \quad (4)$$

$$\overline{B}_n = (n-1)B_n, \text{ and} \quad (5)$$

$$\tan\theta = P_H / (Q' P_V), \quad (6)$$

where n, m, $P_H$, $P_V$, and $L_E$ are as defined above, Q' is a slant weight, and $Q' \leq 1$; and
   the slantwise strip parallax barrier structure optimization method, comprising calculating an aperture width reducing amount $\Delta B$ through the following formula:

$$\Delta B \geq (1/m)B_n \quad (7),$$

where m is as defined above.

2. The multi-view 3D image display method according to claim 1, wherein values of all parameters in the formulas (3), (4), (5), (6), and (7) are optimally: $n \geq 2$, $m=2$, $Q=1$, $\Delta=0$, $\Pi=1$, and $Q'=1$.

3. The multi-view 3D image display method according to claim 1, wherein values of all parameters in the formulas (3), (4), (5), (6), and (7) are optimally: $n \geq 2$, $m=3$, $Q=1$, $\Delta=0$, $\Pi=1$, and $Q'=1$.

4. The multi-view 3D image display method according to claim 1, wherein values of all parameters in the formulas (3), (4), (5), (6), and (7) are optimally: $n \geq 2$, $m=2$, $Q=2$, $\Delta=0$, $\Pi=1$, and $Q' \geq 2$.

5. The multi-view 3D image display method according to claim 1, wherein values of all parameters in the formulas (3), (4), (5), (6), and (7) are optimally: $n \geq 2$, $m=3$, $Q=2$, $\Delta=0$, $\Pi=1$, and $Q' \geq 2$.

6. The multi-view 3D image display method according to claim 1, wherein in the planar display screen having sub-pixels in strip configuration, R, G, and B sub-pixels are in horizontal strip configuration.

7. The multi-view 3D image display method according to claim 1, wherein in the planar display screen having sub-pixels in strip configuration, R, G, and B sub-pixels are in vertical strip configuration.

8. The multi-view 3D image display method according to claim 1, wherein a horizontal mirroring process is performed on the multi-view combined 3D image and the slantwise strip parallax barrier structure to acquire a geometric feature of different slant.

9. The multi-view 3D image display method according to claim 1, wherein the n single view images are acquired through convergent 3D photography or parallel 3D photography.

10. The multi-view 3D image display method according to claim 1, wherein the planar display screen is a liquid crystal screen, a plasma screen, or an organic light emitting diode (OLED) screen.

11. A multi-view 3D image display method, mainly comprising:

a planar display screen having sub-pixels in strip configuration, for displaying a multi-view combined 3D image $\Sigma_n'$, wherein the screen is formed of (N×M) R, G, and B sub-pixels, N is a total number of sub-pixels in a horizontal direction of the screen; M is a total number of sub-pixels in a vertical direction of the screen; j and i are respectively indexes of a horizontal position and a vertical position of a single sub-pixel, $0 \leq j \leq N-1$, and $0 \leq i \leq M-1$, the R, G, and B sub-pixels have a feature of strip configuration, and the single sub-pixel has a size of $P_H \times P_V$, where $P_H$ is a horizontal width of a sub-pixel, and $P_V$ is a vertical height of a sub-pixel;

n' single view images $V_k$, wherein a feature of an equal shooting-angle exists between the adjacent single view images, and each of the single view images $V_k$ is represented by the following formula:

$$V_k = \sum_{i=0}^{M-1}\sum_{j=0}^{N-1} v_k^{i,j}, \qquad (8)$$

where n' is a multiple total view number, and a value of n' is represented by the following formula:

$$n' = m \times n \qquad (9),$$

where n is a total view number, and n>2; m is a number of sub-pixels in a horizontal smallest display unit, and m≥2; M, N, i, and j are as defined above, k is a view number, and $0 \leq k < n'$; and $V_k^{i,j}$ is image data of a sub-pixel at a position (i,j) in the single view image $V_k$;

a multi-view combined 3D image $\Sigma_n'$, formed of the n' single view images, and generated through a multi-view 3D image combination method, wherein the multi-view combined 3D image $\Sigma_n'$ is represented by the following formula:

$$\Sigma_n' = \sum_{i=0}^{M-1}\sum_{j=0}^{N-1} v_\Gamma^{i,j}, \qquad (10)$$

where M, N, i, and j are as defined above, and $\Gamma$ is a view number, and $0 \leq \Gamma < n'$;

a multi-view 3D image combination method, comprising calculating the view number $\Gamma$ through the following formula, and generating the multi-view combined 3D image $\Sigma_n'$:

$$\Gamma = \text{Mod}\left[\text{int}\left(j - \Pi \times \text{int}\left(\frac{i+\Delta}{Q}\right)\right), n'\right], \qquad (11)$$

where i, j, and n' are as defined above, Q is a number of sub-pixels in a vertical smallest display unit; $\Delta$ is a horizontal displacement phase; $\Pi$ is a horizontal displacement amplitude, values of all parameters in the formula (11) are: $Q \geq 1$, $\Delta=0$, and $\Pi=1$; int is a function of rounding, and Mod is a function of taking a remainder;

a slantwise strip parallax barrier, for performing an effect of view separation on the multi-view combined 3D image $\Sigma_n'$ at a plurality of optimum viewing points on an optimum viewing distance, so as to respectively display a single view image without cross-talk, the distance between the adjacent optimum viewing points is equal to $L_E/m$, where $L_E$ is an interpupillary distance (IPD), m is as defined above, a structure of the slantwise strip parallax barrier is mainly formed of a plurality of slantwise strip transparent components and a plurality of slantwise strip opaque components, a slantwise strip parallax barrier structure design method is used to design and acquire an aperture width $B_n$ of the transparent component, an opaque width $\overline{B}_n$ of the opaque component, and a slant angle $\theta$; a slantwise strip parallax barrier structure optimization method is used to design and acquire an aperture width reducing amount $\Delta B$, and through the reduction of the aperture width reducing amount $\Delta B$ introduced to the aperture width $B_n$ of the transparent component, so the objectives of solving a direct cross-talk phenomenon and balancing a phenomenon of asymmetrical left and right viewing freedom are achieved;

the slantwise strip parallax barrier structure design method, comprising calculating an aperture width $B_n$ of the transparent component, an opaque width $\overline{B}_n$ of the opaque component, and a slant angle $\theta$ through the following formulas:

$$B_n = \frac{mP_H L_E}{mP_H + L_E}, \qquad (12)$$

$$\overline{B}_n = (n-1)B_n, \text{ and} \qquad (13)$$

$$\tan\theta = P_H / (Q' P_V), \qquad (14)$$

where n, m, $P_H$, $P_V$, and $L_E$ are as defined above, Q' is a slant weight, and $Q' \geq 1$; and the slantwise strip parallax barrier structure optimization method, comprising calculating the aperture width reducing amount $\Delta B$ through the following formula:

$$\Delta B \geq [(m-1)/m]B_n \qquad (15),$$

where m is as defined above.

12. The multi-view 3D image display method according to claim 11, wherein values of all parameters in the formulas (9), (11), (12), (13), (14), and (15) are optimally: n>2, m=2, Q=1, $\Delta=0$, $\Pi=1$, and Q'=1.

13. The multi-view 3D image display method according to claim 11, wherein values of all parameters in the formulas (9), (11), (12), (13), (14), and (15) are optimally: n>2, m=3, Q=1, $\Delta=0$, $\Pi=1$, and Q'=1.

14. The multi-view 3D image display method according to claim 11, wherein values of all parameters in the formulas (9), (11), (12), (13), (14), and (15) are optimally: n>2, m=2, Q=2, $\Delta=0$, $\Pi=1$, and $Q \geq 2$.

15. The multi-view 3D image display method according to claim 11, wherein values of all parameters in the formulas (9), (11), (12), (13), (14), and (15) are optimally: n>2, m=3, Q=2, $\Delta=0$, $\Pi=1$, and $Q \geq 2$.

16. The multi-view 3D image display method according to claim 11, wherein in the planar display screen having sub-pixels in strip configuration, R, G, and B sub-pixels are in horizontal strip configuration.

17. The multi-view 3D image display method according to claim 11, wherein in the planar display screen having sub-pixels in strip configuration, R, G, and B sub-pixels are in vertical strip configuration.

18. The multi-view 3D image display method according to claim 11, wherein a horizontal mirroring process is performed on the multi-view combined 3D image and the slant-wise strip parallax barrier structure to acquire a geometric feature of different slant.

19. The multi-view 3D image display method according to claim 11, wherein the n' single view images are acquired through convergent 3D photography or parallel 3D photography.

20. The multi-view 3D image display method according to claim 11, wherein the planar display screen is a liquid crystal screen, a plasma screen, or an organic light emitting diode (OLED) screen.

* * * * *